United States Patent [19]
Loshin

[11] 4,025,948
[45] May 24, 1977

[54] CODING SYSTEM FOR PAY TELEVISION APPARATUS

[75] Inventor: Albert M. Loshin, Melville, N.Y.

[73] Assignee: Teleglobe Pay-TV System, Inc., Rego Park, N.Y.

[22] Filed: Feb. 25, 1975

[21] Appl. No.: 552,787

[52] U.S. Cl. .............................. 358/122; 358/124
[51] Int. Cl.² ........................................ H04N 1/44
[58] Field of Search ................. 178/5.1, DIG. 13; 325/308

[56] References Cited

UNITED STATES PATENTS

| | | | |
|---|---|---|---|
| 3,081,376 | 3/1963 | Loughlin et al. | 178/5.1 |
| 3,081,377 | 3/1963 | Watters | 178/5.1 |
| 3,527,877 | 9/1970 | Walker | 178/5.1 |
| 3,732,355 | 5/1973 | Harna et al. | 178/5.1 |
| 3,757,035 | 9/1973 | Sullivan | 178/5.1 |
| 3,824,332 | 7/1974 | Horowitz | 178/5.1 |
| 3,878,322 | 4/1975 | Sullivan | 178/5.1 |
| 3,919,462 | 11/1975 | Hartung et al. | 178/5.1 |

Primary Examiner—Maynard R. Wilbur
Assistant Examiner—S. C. Buczinski
Attorney, Agent, or Firm—Marianne Rich

[57] ABSTRACT

At the sending end, a plurality of high-frequency oscillators each furnish a signal having a frequency different from the frequency of the other of the oscillators. Timing signals derived from the television signal and signals from a random pulse generator are combined to furnish enabling signals for enabling the high-frequency oscillators during predetermined time intervals of the television signal and in a random order. A logic circuit which includes externally operable switches for setting up a program code assignment receives the enabling signals and furnishes an encoder control signal only in response to certain selected enabling signals. The encoder control signal changes the polarity of the picture signals relative to the synchronizing signals in the television signal. A mixer mixes the oscillator signals into the encoded television signal. At the decoder the oscillator signals are filtered out, and a logic circuit set up in accordance with a punch card having a program corresponding to the code assignment at the encoder furnishes a decoder control signal which causes a reversal of the polarity of the picture signals thereby reestablishing a standard television signal.

24 Claims, 14 Drawing Figures

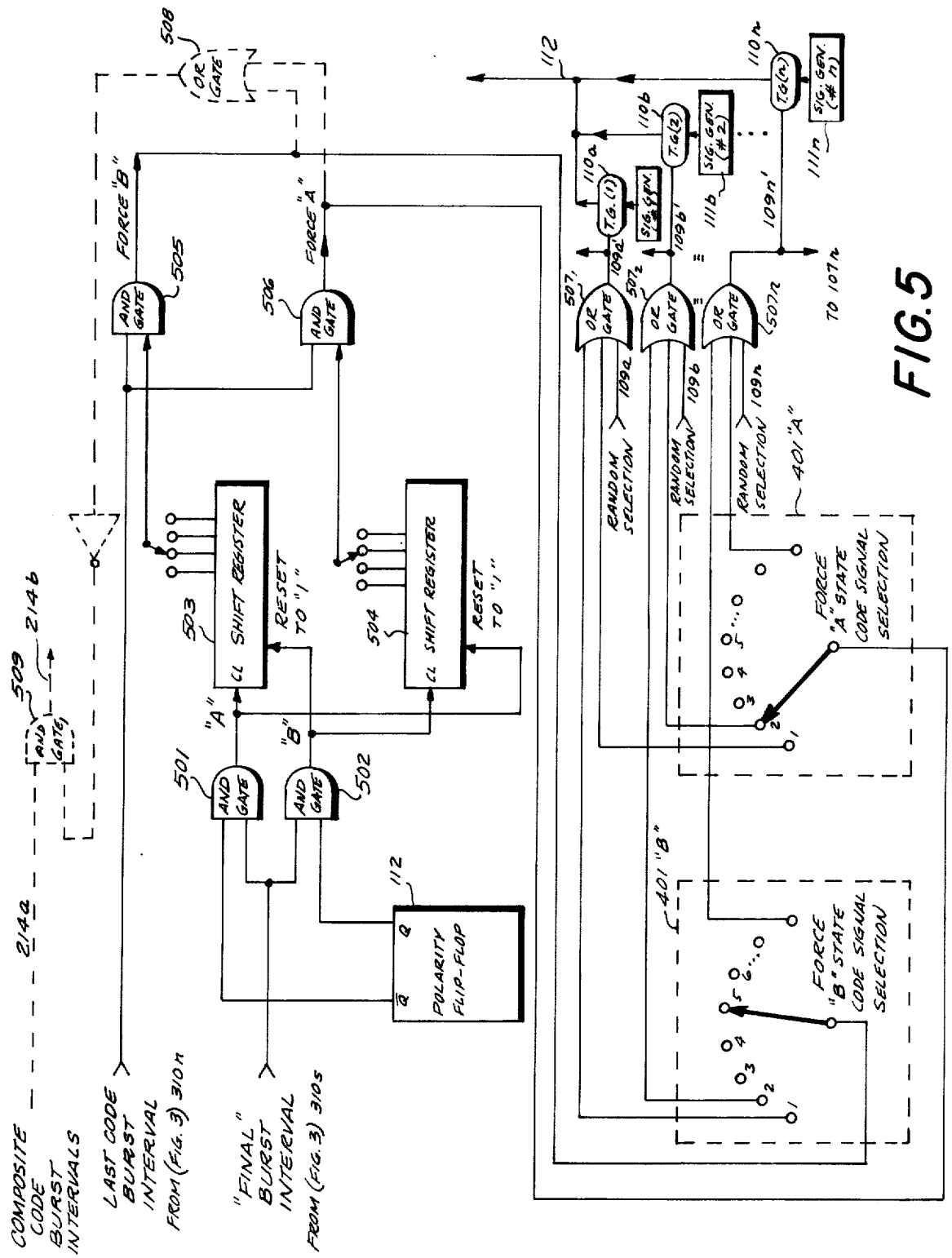

4,025,948

CODING SYSTEM FOR PAY TELEVISION APPARATUS

BACKGROUND OF THE INVENTION

This invention resides in pay television systems including both over-the-air and cable television systems. More specifically, it resides in such systems wherein a determined characteristic of the composite television signal is changed either periodically or aperiodically at the sending end in order that a scrambled picture be received at the receiver unless a decoder is properly set up to complement the changes caused at the transmitting end and thus generate a standard television signal yielding a clear picture when applied to the conventional TV receiver.

SUMMARY OF THE INVENTION

It is an object of the present invention to provide a coding system for coding television signals in the above-mentioned systems in such a manner that proper viewing without payment of the fee is made extremely difficult. At the same time it is desired that such coding equipment be versatile and inexpensive to implement.

The present invention resides in a pay television system having encoder means at the sending end for changing a determined characteristic of an input television signal from a normal to an encoded state in response to an encoder control signal, thereby creating an encoded television signal. Further, decoder means are present at the receiving end for changing said determined characteristic back to said normal state in response to a decoder control signal. The present invention comprises a coding system which includes a plurality of coding signal furnishing means for furnishing a plurality of coding signals each having a characteristic value differing from the corresponding characteristic value of the other of said coding signals, each in response to a corresponding enabling signal. The invention further comprises enabling means connected to said coding signal furnishing means for furnishing said enabling signals to said coding signal furnishing means in a random order during predetermined time intervals of said uncoded television signal. Programmable logic circuit means which include externally operable means for setting up a program code assignment are also furnished. These are connected to the enabling means and the encoder means for furnishing said encoder control signal only in response to enabling signals selected in accordance with said program code assignment. Mixer means connected to said coding signal furnishing means are provided for inserting said coding signals into said television signal. The so-inserted coding signals constitute code bursts for operating the decoder means at the receiving end.

At the receiving end, a plurality of filter means are furnished each for filtering out a corresponding one of said code bursts and furnishing a corresponding decoder input signal. Program storage means are furnished having said program code assignment stored thereon. Finally, decoder logic circuit means are furnished which are operative only under control of said program storage means for receiving said decoder input signals and furnishing said decoder control signal in response to determined ones of said decoder input signal selected in accordance with said program code assignment, thereby causing said decoder means to change said predetermined characteristic back to said normal state.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS:

FIG. 5 is a schematic diagram of a circuit for limiting the maximum number of consecutive "A" or "B" fields;

DESCRIPTION OF THE PREFERRED EMBODIMENTS

Figure 1:
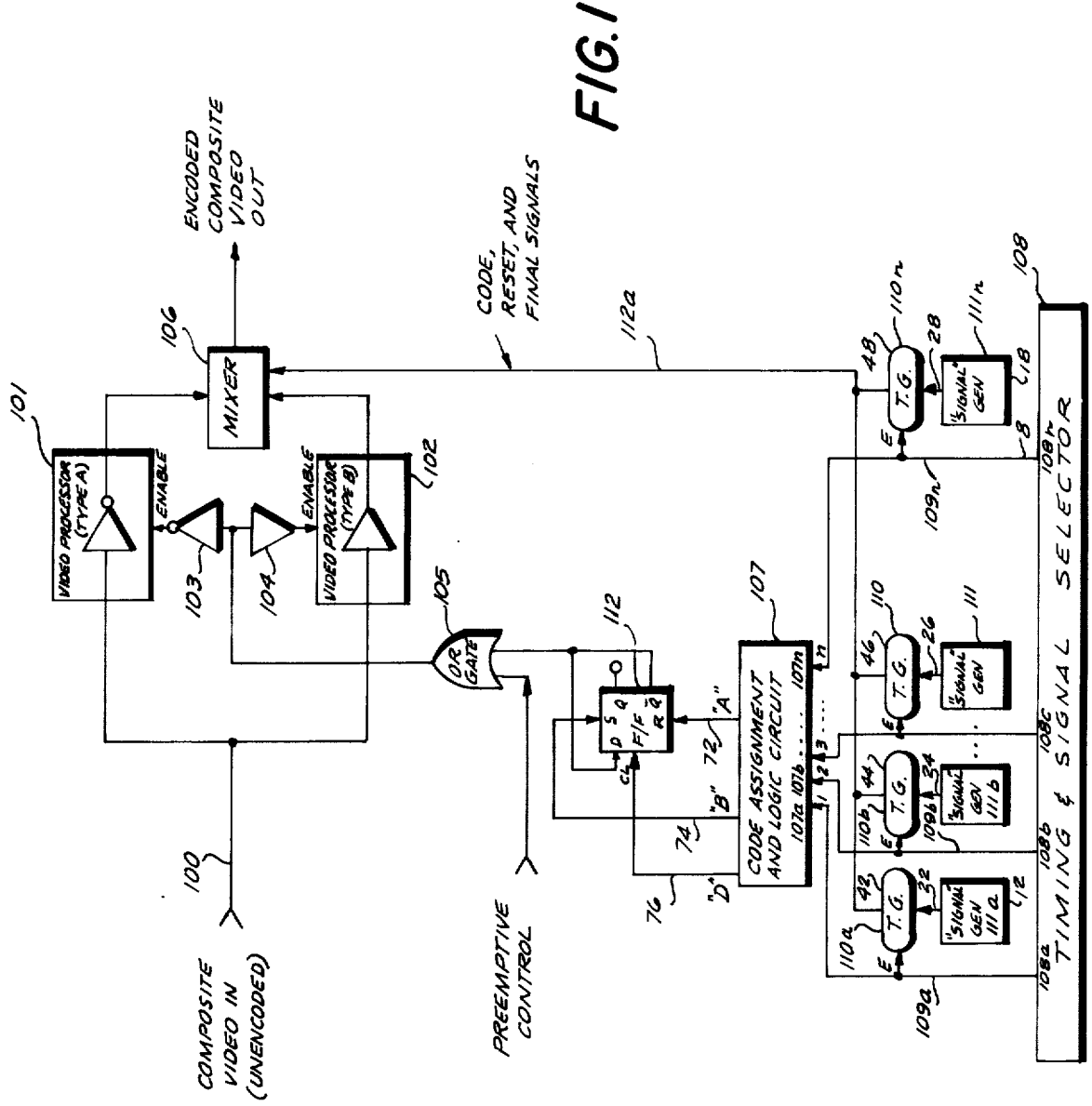
FIG. 1 is a block diagram showing the interconnection of an encoder of the present invention with television signal processing equipment.

A preferred embodiment of the present invention will now be described with reference to the drawing. It should be noted that the same components shown in different figures have the same reference symbols.

FIG. 1 is a basic block diagram of an encoding circuit of the present invention as interconnected with an over-the-air pay television signal processing arrangement as disclosed in U.S. Pat. No. 3,824,332 (Horowitz). The present invention can of course be utilized with other signal processing equipment including other types of over-the-air systems and pay cable television systems and is not to be limited to the particular embodiment shown. The equipment disclosed in the Horowitz patent will be summarized briefly only in order to show the interconnection of the present circuitry with this particular equipment.

Referring now to FIG. 1, the composite television signal in unencoded form is received at terminal 100. The television signal is applied simultaneously to a first amplifier 101 and a second amplifier 102, respectively labelled video processor (type A) and video processor (type B). It will be noted that the type A processor is an inverting amplifier while the type B processor is a direct amplifier, that is any signal received at the output of amplifier 101 will be inverted with respect to the signal applied at the input, while the signal at the output of amplifier 102 will have the same polarity as that applied at its input. Enable signals are applied to the amplifiers at corresponding enable terminals. Specifically, amplifier 101 is enabled by a signal at the output of an inverting amplifier 103 while amplifier 102 is enabled by a signal at the output of non-inverting amplifier 104. The inputs of amplifiers 103 and 104 are connected in common to the output of an OR-gate 105. Since amplifier 103 is an inverting and amplifier 104 is a non-inverting amplifier, it will be seen that a signal at the output of OR-gate 105 will cause amplifier 101 to be disabled and amplifier 102 to be enabled. Thus only one of amplifiers 101 and 102 is enabled at any one time.

The outputs of amplifiers 101 and 102 are applied to a mixer 106 which has a further input for receiving code, reset and final burst signals. At the output of mixer 106 is the encoded composite television signal.

The above-mentioned OR-gate 105 has a first input connected to receive preemptive control signals such as the horizontal and vertical blanking interval signals and a second input connected to the $\overline{Q}$ output of a polarity flip-flop 112 the control of which is the subject of the present invention. It will thus be noted that the composite unencoded television signal always passes through the non-inverting amplifier during the horizontal and vertical blanking intervals. During the actual picture signal intervals the signal passes either through amplifier 101 or through amplifier 102 in dependence on the state of flip-flop 112. If there is a "1" output at the $\overline{Q}$ of flip-flop 112, the picture signal portion of the composite video signal will not be inverted, that is it will maintain its normal relationship with the horizontal and vertical synchronizing signals. For a O output, the picture signal will be inverted and, thus, for a black and white television set the normally black portions will appear to be white and the normally white portions will appear to be black. The O signal at the Q output is herein called the encoder control signal. The signals from the outputs of amplifiers 101 and 102 after combination in mixer 106 will thus contain picture signal portions alternately inverted and non-inverted, depending on the state of the $\overline{Q}$ output of flip-flop 112.

Flip-flop 112 is a normal D-type flip-flop having a clock, set and reset input respectively labelled CL, S and R in FIG. 1. The reset input of flip-flop 112 is connected to the A output of code assignment and logic circuit 107, while the S and CL inputs are connected to the B and D outputs of unit 107, respectively. Inputs 107a, 107b . . . 107n of unit 107 are connected to outputs 108a, 108b . . . 108n of a timing and signal selector 108 (one embodiment of enabling means) through lines 109a, 109b. . .109n, respectively. The signal on lines 109a. . .109n also serve to enable transmission gates 110a, 110b. . .110n respectively. The signal inputs of transmission gates 110a. . .110n are, respectively, connected to the outputs of signal generators 111a. . .111n. Each of these signal generators is an oscillator furnishing an oscillation having a frequency different from the frequencies of all other of these oscillators and, in a preferred embodiment, all lying in a frequency range between 160KHz and 3MHz.

The outputs of transmission gates 110a. . .110n are connected in common to a line 112 which furnishes these signals to mixer 106.

For the system to be described here, the inversion of the picture signals relative to the synchronizing signals takes place throughout randomly selected fields, that is, if it has been decided by the control circuitry that the picture signals are to be inverted relative to the synchronizing signals, this inversion takes place throughout the subsequent field. If, on the contrary, it has been decided that no inversion is to take place, that is that the picture signal portion as well as the synchronizing signal portion are to pass through amplifier 102, then this condition also prevails throughout the subsequent field. The present coding system will be discussed with reference to this particular type of pay television system encoding, but is of course in no way limited thereto. Inversion of the signals could take place on any other basis, such as for example on selected lines only, without in any way interfering with the applicability of the coding system which is the subject of the present invention.

Since the inversion or lack of inversion of the video signal relative to the synchronizing signals is determined by the absence or presence of a "1" signal at the $\overline{Q}$ output of flip-flop 112, the function of the circuitry of the present invention is to control this signal. Specifically, in the preferred embodiment the variation of the $\overline{Q}$ output is to take place in random or pseudorandom fashion. Simultaneously with this random selection of the state of the $\overline{Q}$ output of flip-flop 112 coding signals are to be fed to mixer 106 which, upon detection at the receiver, result in inversion or non-inversion of the picture signals relative to the synchronizing signals in correspondence to the inversion or lack of inversion at the transmitter.

Figure 11:
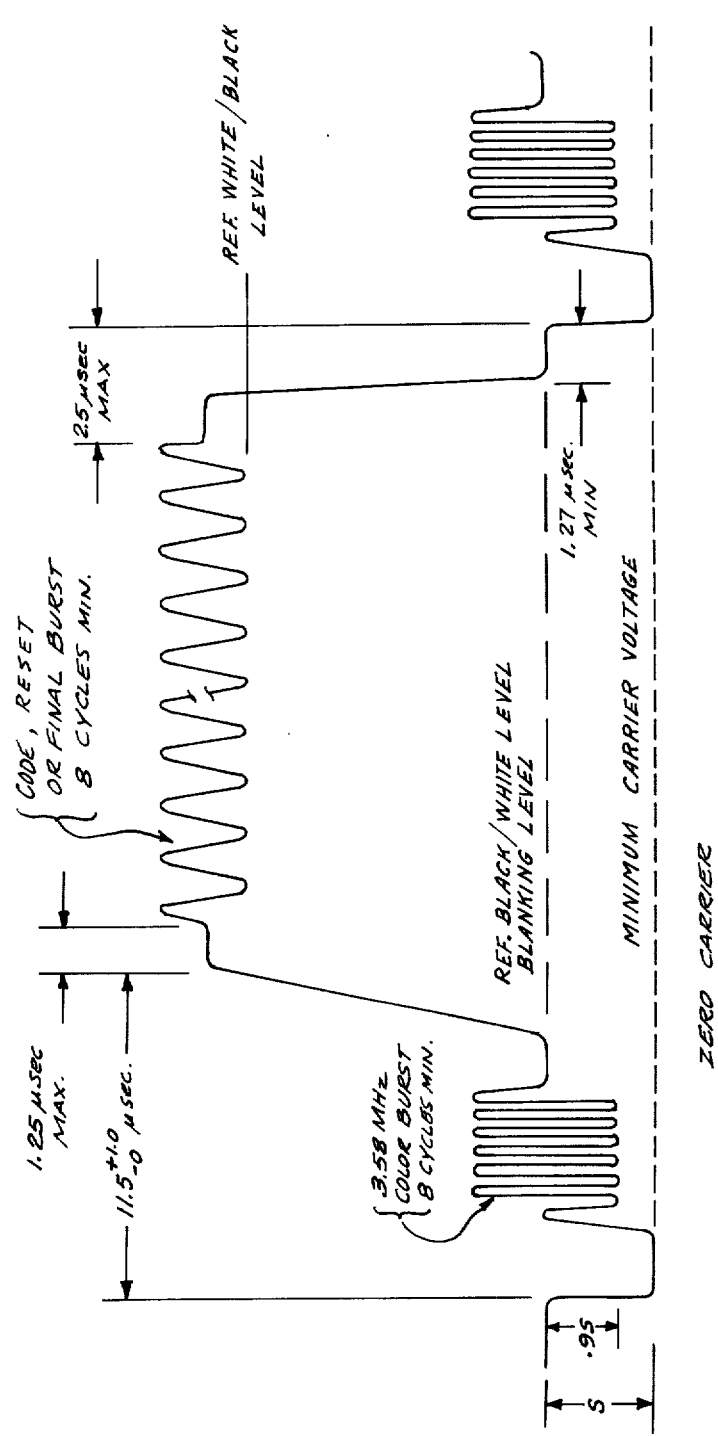
FIG. 11 is a diagram showing waveforms during a vertical blanking interval of a coded television signal.

Referring again to FIG. 1, receipt of an enable signal at a transmission gate passes the signal from the corresponding signal generator to the mixer through line 112a and secondly the enable signal is applied to the code assignment and logic circuit 107. In the code assignment logic, which will be discussed in greater detail with reference to FIG. 4, the receipt of an enable signal corresponding to a particular frequency causes an output at either the A or B or D outputs of the code assignment logic circuits. Thus the flip-flop is reset when a signal (tone burst) having a frequency assigned to the A output is received, is set when a tone burst assigned to the "B" output is received and is changed from the set to the reset state or vice versa upon receipt of a tone burst assigned to the D output. The enabling of the signal generators takes place under control of the timing and signal selector 108. This timing and signal selector has two individual parts. First, it contains a time burst interval generator which will be discussed in greater detail with reference to FIG. 3. This time burst interval generator causes the signals from the oscillators to be transmitted at a specific time in the television signal being coded. Specifically, the tone bursts are to be inserted into the signal to be encoded during the vertical blanking interval and, even more specifically, during selected lines in this interval, chosen to avoid these H-line intervals required for vertical synchronization and equalization. FIG. 11 shows one such horizontal line interval. The total time of the interval is approximately 63 microseconds. The code bursts must not, of course, interfere with the horizontal synchronizing signal, or if the signal to be encoded is a color television signal, with the color bursts. The code burst signal is thus to occupy approximately 49 microseconds within the horizontal line interval of 63 microseconds. While FIG. 11 shows one individual frequency as the code burst, it is of course also possible and will be discussed in detail below that more than one frequency, that is a combination of tone bursts, occur during this or any other line interval.

The second function of timing and signal selector 108 is to make the selection of the oscillators a random selection. Thus the system of FIG. 1 functions to enter code bursts of a randomly selected frequency into predetermined line intervals during the vertical blanking interval and, further, at the end of the vertical blanking interval to utilize the then-existing state of flip-flop 112 to determine whether or not the picture signals are to be inverted or non-inverted during the subsequent field relative to the synchronizing signals.

Figure 2:
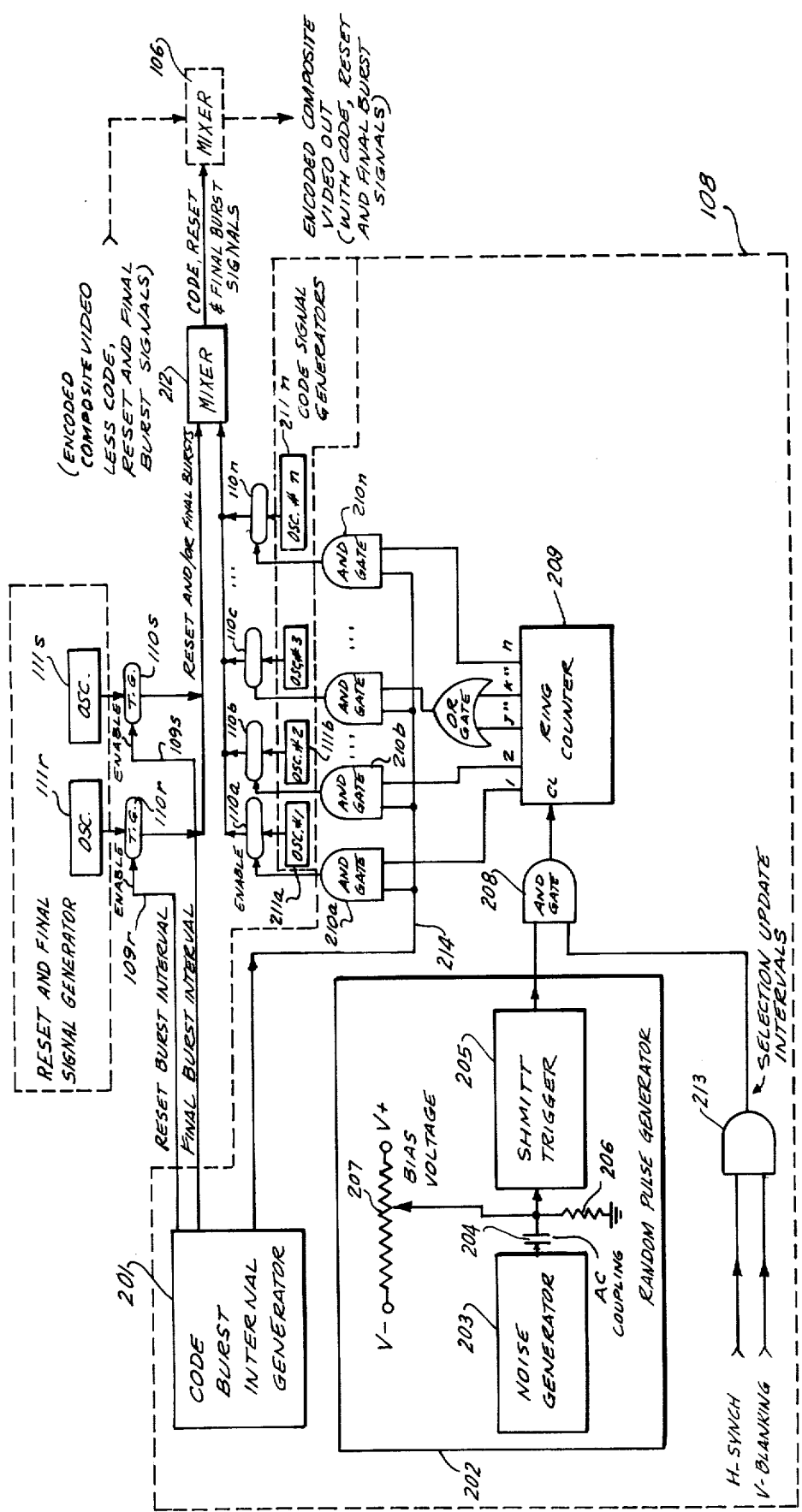
FIG. 2 is a more detailed diagram of the timing and signal selector of FIG. 1.

FIG. 2 is a more detailed diagram of the timing and signal selector of FIG. 1. The code burst interval generator is labelled 201 and determines the timing at which the transfer from the oscillators to the mixer is to take place. Reference numeral 202 refers to a random or pseudorandom pulse generator. It comprises a noise generator 203 which generates a very high frequency noise voltage. The output of noise generator 203 is AC-coupled through a capacitor 204 to the input of a Schmitt trigger 205. The input of Schmitt trigger 205 is further connected to ground potential through a resistor 206. A biasing voltage is applied to the input of Schmitt trigger 205 by means of a potentiometer 207.

The random pulse generator 202 works as follows:

Noise generator 203 furnishes an output signal having randomly varying amplitudes. This signal is AC-coupled to the Schmitt trigger and, whenever it exceeds a certain amplitude as determined by the setting of potentiometer 207, Schmitt trigger 205 furnishes an output pulse having a determined amplitude.

The output of Schmitt trigger 205 is applied to one input of an AND-gate 208. The other input of AND-gate 208 receives a timing signal which is derived from the horizontal synchronizing signals during the vertical blanking interval via AND-gate 213. Since a very high number of pulses of sufficient width to trigger counter 209 will appear at the output of Schmitt trigger 205 during each horizontal synchronizing pulse, an arbitrary plurality of pulses will appear at the output of AND-gate 208 thereby advancing ring counter 209 to some random number. Ring counter 209 in a preferred embodiment of the present invention is a shift register in which a pulse is shifted to a subsequent stage in response to each of the pulses from AND-gate 208. The outputs of ring counter 209 are applied individually or in groups through "OR" gates to constitute the first inputs of AND-gates 210a-210n. The second inputs of AND-gates 210a-210n are connected in common to the output of code burst interval generator 201. Code burst interval generator 201 as will be discussed in more detail below, furnishes a pulse extending over an approximately 49 microsecond interval following each horizontal synchronizing pulse. Thus an output will appear at one of AND-gates 210a-210n at the correct time during the vertical blanking interval. Which of AND-gates 210a-210n has the output is determined by ring counter 209, that is determined on a random or pseudorandom basis. Whichever AND-gate furnishes an output causes the corresponding transmission gate 110a-110n to be enabled, thereby causing the output of the corresponding one of oscillators 211a-211n to be fed to an intermediate mixer 212 and, from the output of mixer 212 to the input of mixer 106 of FIG. 1.

Code burst interval generator 201 has two further outputs, namely a reset burst interval output and a final burst interval output. The function of these are as follows:

The reset burst interval is an interval during a horizontal line or lines immediately preceding the vertical blanking interval. The final burst interval is a horizontal line interval or portion thereof following the last code burst interval. The reset burst interval signal is applied to the enable input of transmission gate 110r whose signal input is connected to an oscillator 111. The final burst interval signal is applied to the enable input of a transmission gate 110s whose signal input is applied to an oscillator 111s. The outputs of transmission gates 110r and 110s are applied in common to the second input of the intermediate mixer 212. The frequency of oscillations of oscillators 111r and 111s are of course predetermined frequencies differing from each other and from the remaining ones of oscillators 211a-211n for a particular program code. The oscillators may be interchanged to establish new program code assignments. The reset burst is utilized to reset flip-flop 112 in the encoder and a corresponding flip-flop in the decoder prior to the vertical blanking interval. The final burst has a function which is utilized in both the encoder and the decoder and will be discussed in greater detail with reference to FIGS. 4 and 9A. As shown in FIG. 2, the output of mixer 106 is the encoded composite television signal including code, reset and final burst signals.

Figure 3:
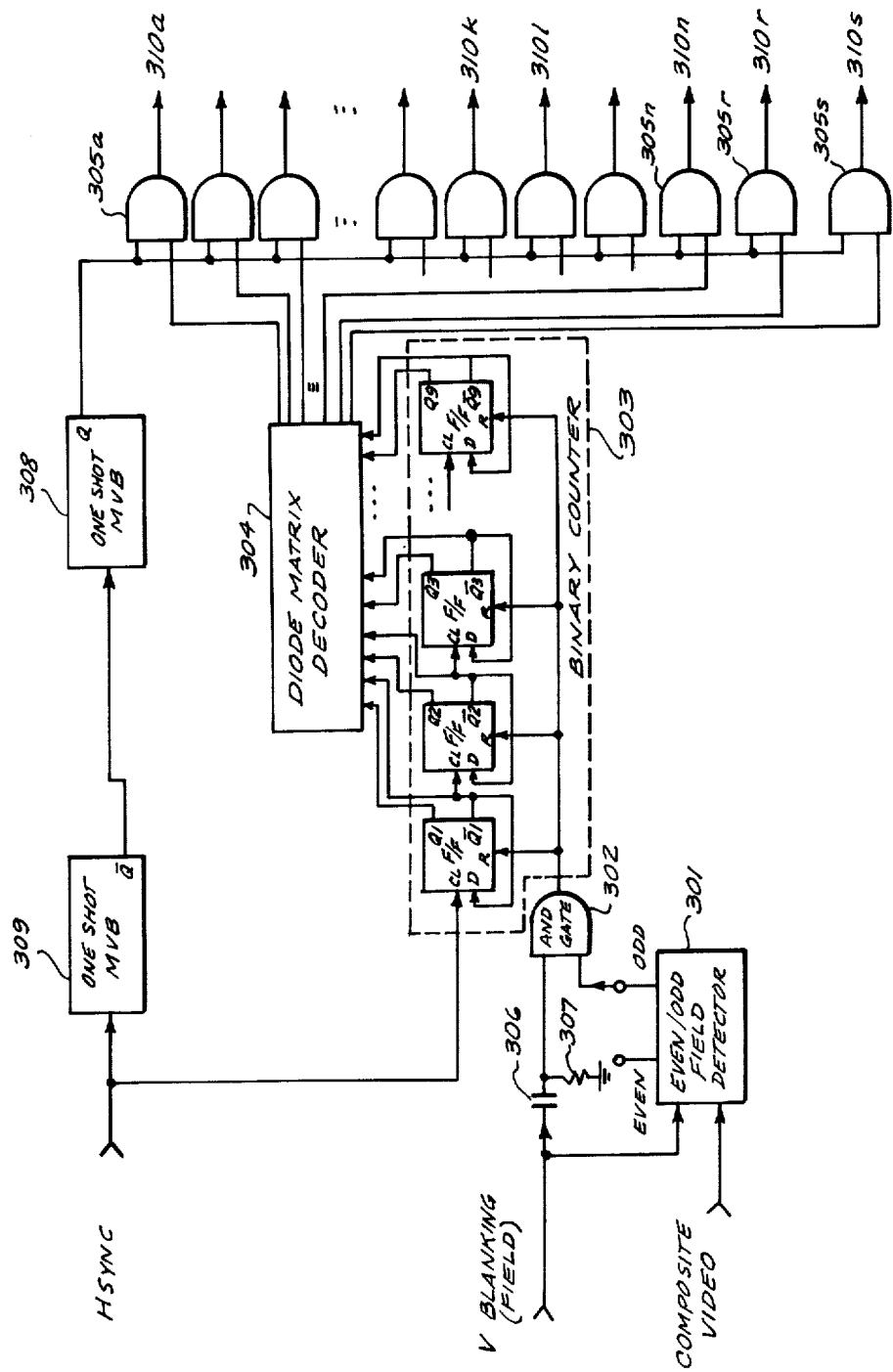
FIG. 3 is a more detailed diagram of the time burst interval generator of FIG. 1.

FIG. 3 is a more detailed diagram of the code burst interval generator 201 of FIG. 2. The unencoded composite television signal is first applied to an even/odd field detector 301. The odd field output of even/odd field detector 301 is applied to one input of an AND-gate 302 whose other input receives the vertical blanking signal after differentiation in a differentiating circuit consisting of a capacitor 306 and a resistor 307. The output of AND-gate 302 is used to reset all stages of a binary counter 303. Binary counter 303 is thus reset at the beginning of alternate vertical blanking intervals.

The counting or clock input of binary counter 303 receives the horizontal synchronizing signals. The count on counter 303 thus corresponds to the number of lines following the start of alternate vertical blanking intervals. The outputs of counter 303 constitute the inputs of a diode matrix 304 whose outputs are each connected to one input of one of AND-gates 305a-305n, 305r and 305s. The second inputs of AND-gates 305a-305n are connected to the output of a one-shot multivibrator 308 whose input is connected to the output of a one-shot multivibrator 309. The input to one-shot multivibrator 309 is the horizontal synchronizing signal.

The above-described arrangement operates as follows:

Receipt of a horizontal synchronizing signal causes an advance of counter 303 and further, after a delay of approximately 13 microseconds, causes a 1 signal to appear at the Q output of one-shot multivibrator 309. When this output appears, one-shot multivibrator 308, whose output has a duration of approximately 49 microseconds, is enabled. A signal thus appears at the output of one-shot multivibrator 308 for a time interval of approximately 49 microseconds delayed by 13 microseconds following receipt of the horizontal synchronizing signal. The Q output of multivibrator 308 enables all second inputs of AND-gates 305a-305n, 305r and 305s. The outputs of AND-gates 305 are thus timing signals signifying the timing intervals at which code bursts are to be inserted into the encoded television signal. Again with reference to FIG. 11, these timing signals occur during selected lines of the vertical blanking interval and at a predetermined time interval during each horizontal line interval which does not interfere with the horizontal synchronizing and color burst signals. The number of AND-gates 305 is such as to include the reset, final and code burst intervals. In a preferred embodiment of the present invention which utilizes six code bursts, the number of AND-gates is equal to sixteen, that is the number of AND-gates 305 is equal to the number of code burst intervals plus the final and the reset burst intervals, multipled by two, since there are two fields in each frame. The outputs of AND-gates 305a-305n, are applied to the inputs of an OR-gate (not shown). The output of the OR-gate is then the signal on line 214 of FIG. 2.

Figure 4:
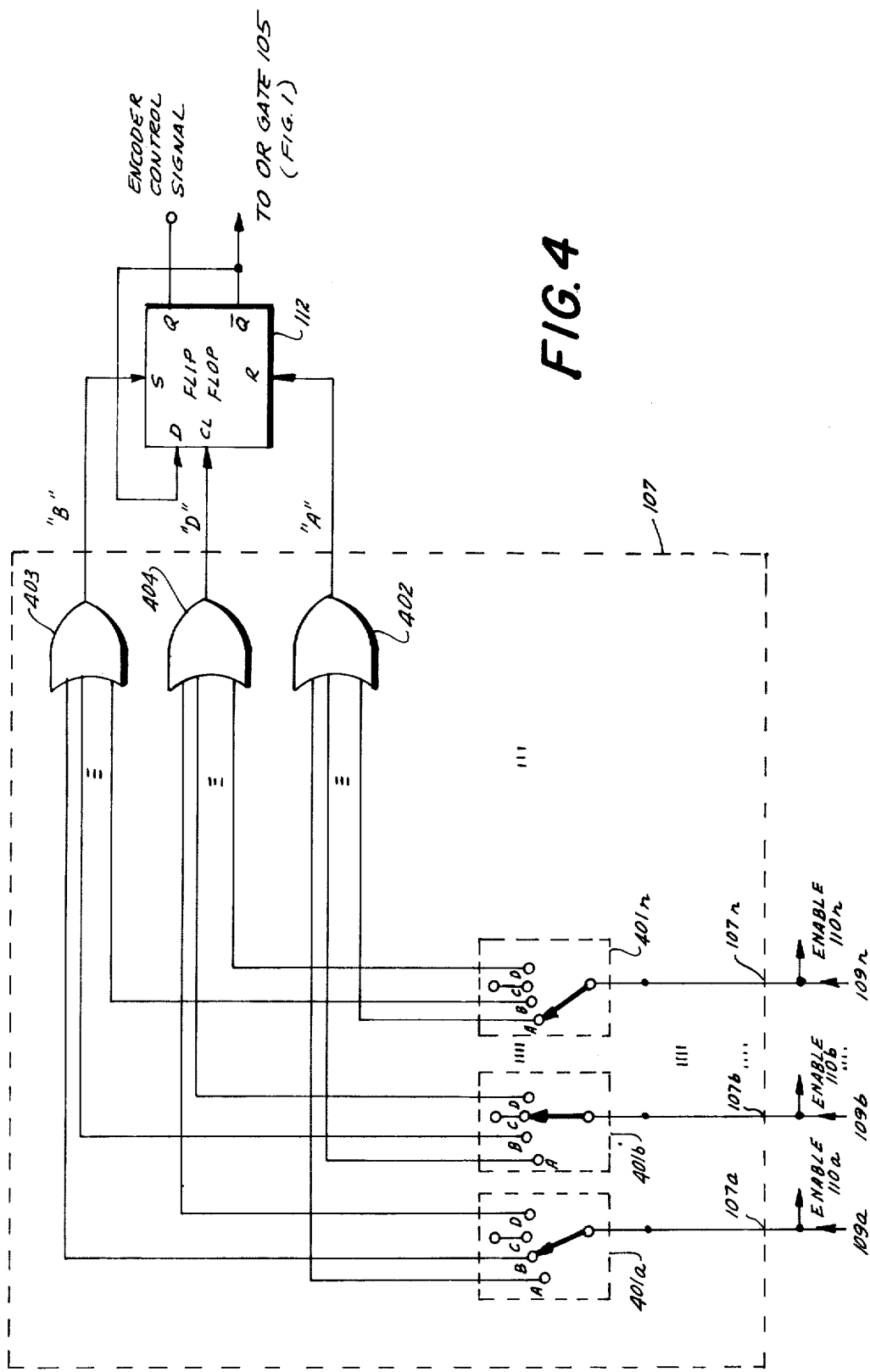
FIG. 4 is a more detailed diagram of the code assignment logic circuit of FIG. 1.

FIG. 4 shows a preferred embodiment of the code assignment logic circuit 107 of FIG. 1. The code assignment logic circuit 107 comprises a set of $n$ switches that is a number of selection switches equal to the number of oscillators 211a-211n. Only three of these selection switches are shown in FIG. 4, namely switches 401a, 401b and 401n. Each of these selection switches has a plurality of terminals A, B, C and D. Each A terminal is connected to one input of an OR-gate 402, each B terminal is connected to one input of an OR-gate 403, each D terminal is connected to one input of an OR-gate 404, while the C terminals are not connected to any of the OR-gates. This is because the C mode is present only to allow a code burst which does not enter into the activation of flip-flop 112 to be transmitted for confusion purposes. Again, the C mode is an optional mode. The signal as illustrated on line 109b which is assigned to the C mode will enable its corresponding transmission gate but will not take part in changing the state of flip-flop 112.

The above-described circuitry operates as follows:

Prior to the start of each program to be transmitted through the pay television system, switches 401a-401n are each set manually in correspondence with a predetermined code assignment. It is necessary that this code assignment be predetermined since at the receiver a detector must be set in correspondence therewith or proper decoding of the signal cannot take place.

Each of the switches is thus set to a selected one of modes A, B, C or D. Thus whenever a signal appears on line 109b, for example, the state of flip-flop 112 is unaffected. Whenever, however, a signal appears on line 109a flip-flop 112 is set, since a signal will appear at the input of OR-gate 403 whose output in turn sets flip-flop 112. A signal at the Q output of course is accompanied by an absence of a signal at the $\overline{Q}$ output but, referring to FIG. 1, the absence of a signal at the $\overline{Q}$ output during the vertical blanking interval has no effect since OR-gate 105 receives the preemptive control signal during this time. A subsequent signal on line 109b will have no effect on flip-flop 112, while a signal on line 109c which is routed to an input of OR-gate 402 will cause flip-flop 112 to reset. Whichever state is attained by flip-flop 112 immediately prior to the end of the vertical blanking interval is retained throughout the next consecutive field, since no further signals will be received on lines 109a-109n until the end of the said field. This final state of flip-flop 112 does have an effect, since, depending on the absence or presence of a signal at the $\overline{Q}$ output of flip-flop 112 either amplifier 101 or amplifier 102 is enabled throughout the picture signal intervals of the next field. Thus the picture signals, that is the signals carrying the picture information, will either be inverted or of the same polarity as the synchronizing signals throughout the next frame. This will cause a scrambled image to appear on the receiving sets if the signal is not properly decoded, that is if an inversion corresponding to that taking place at the sending end does not take place at the decoder at the receiving end.

In the operation of the encoder as described above, it is entirely possible, although unlikely, that the inverted or the non-inverted state of the picture signals relative to the synchronizing signals is maintained for a great many consecutive fields. It may be preferred that this condition be avoided since a usable picture on the receiver may result under this condition even if the decoder is not activated. It is the object of the circuitry shown in FIG. 5 to limit the maximum number of consecutive A fields as well as the maximum number of consecutive B fields. For the system of FIG. 5, the number of code assignment switches 401a, etc. shown in FIG. 4 has been increased to include a code assignment switch 401 B and a code assignment switch 401 A. The additional switches are required because, in addition to forcing flip-flop 112 in the encoder to the state opposite to the state which has persisted for an excessively long time, it is also necessary to add a code burst to the transmitted composite television signal which then will force the corresponding state in the polarity flip-flop at the receiver. In accordance with FIG. 5, the $\overline{Q}$ output and the Q output of polarity flip-flop 112 are respectively connected to the first inputs of AND-gates 501 and 502. The second inputs of AND-gates 501 and 502 receive the timing signal corresponding to the "final" burst interval from the timing interval selector of FIG. 3. The output of AND-gate 501 is connected to the clock input of a shift register 503, while the output of AND-gate 502 is similarly connected to the clock input of a shift register 504. A selected stage of shift register 503 and a selected stage of shift register 504 serve as first inputs to AND-gates 505 and 506 respectively. The second input for both AND-gates 505 and 506 is derived from line 310n of FIG. 3 which generates a signal during the last code burst interval. Further, the output of AND-gate 505 is connected to the selector arm of switch 401 B while the output of AND-gate 506 is connected to the selector arm of switch 401 A. Switches 401 A and 401 B each have a plurality of selector outputs equal in number to the number of signal generators 111 of FIG. 1. A plurality of OR-gates $507_1 ... 507_n$ also equal in number to the number of signal generators 111 is also shown in FIG. 5, each of the OR-gates having a first input connected to one of the selector outputs of switch 401 B, a second input connected to one of the selector outputs of switch 401 A, and a third input from the corresponding one of lines 109a...109n. The output of each OR-gate 507 is an enable signal on the corresponding one of lines 109 which in turn is applied to the corresponding one of transmission gates 110a...110n. The output of the transmission gates is supplied in common to line 112.

The output of AND-gate 505 and that of AND-gate 506 are applied, respectively, to the first and second input of an OR-gate 508 whose output, after inversion, is applied to an AND-gate 509 whose second input is a signal on a line 241a. The output of AND-gate 509 is furnished on line 214b, which corresponds to line 214 of FIG. 2.

The above-described arrangement operates as follows:

Upon the occurrence of each "final" burst interval, the state of flip-flop 112, the polarity flip-flop, is sampled. If, at this point, there is an output at the $\bar{Q}$ output of flip-flop 112, shift register 503 is advanced by one stage and shift register 504 is reset to one. Similarly, if upon occurrence of the "final" burst interval the Q output of flip-flop 112 is energized, shift register 504 is advanced by one state and shift register 503 is reset to one. Thus the stage of shift register 503 or 504 which is energized indicates how many consecutive A or B frames have occurred. If this number reaches a predetermined number, that is if a predetermined stage of shift register 503, for example, is energized, AND-gate 505 will have an output during the last code burst interval in the next-subsequent frame (as stated before it should be noted that the "last" code burst is the last code burst which has an effect on the setting of the polarity flip-flop both at the encoder and the decoder. The "final" burst is used only for sensing the state of the polarity flip-flop and does not change said state). Since the appearance of an output of AND-gate 505 signifies that excessively many A fields have occurred, the signal at the output of AND-gate 505 passes through switch 401 B which is set to enable a transmission gate 110 assigned to a signal generator 111 whose code assignment under the then-present code causes it to set the polarity flip-flop at the decoder to the set state. An excessive number of A fields in succession thus causes the system to shift to a B mode automatically.

Further, it should be noted that the presence of a signal at the output of either AND-gate 505 or AND-gate 506 should prevent a random code selection during the last code burst interval. For this purpose the above-mentioned OR-gate 508 is provided. A signal at the output of OR-gate 508, which of course can only be present during the last code burst interval, inhibits passage of the signal through AND-gate 509. Line 214b at the output of AND-gate 509 thus carries a signal during any of the code burst intervals in the absence of a signal at the output of OR-gate 508 and during all code burst intervals except the last if a signal is present at the output of OR-gate 508. The circuit of FIG. 5 thus limits the maximum number of consecutive A fields and consecutive B fields which can occur. Obviously if it is desired to limit only the maximum number of consecutive A fields, shift register 504 and AND-gate 506 may be eliminated. Similarly for limiting only the maximum number of consecutive B fields shift registers 504 and AND-gate 506 may be omitted.

Figure 6:
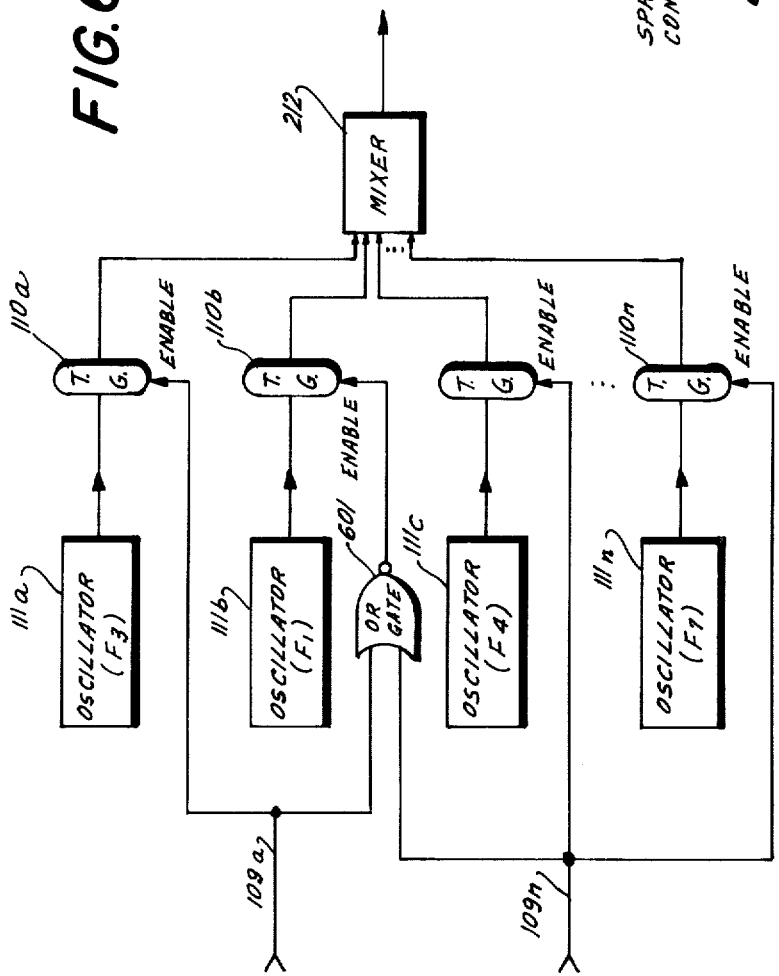
FIG. 6 is a schematic diagram of a circuit utilizing multiple tone bursts for code, reset and final signals.

In the encoder described so far, a code burst of only one selected frequency was inserted into each selected horizontal line interval of the alternate vertical blanking intervals. Shown in FIG. 6 is a variation wherein more than one code burst, that is code bursts of more than one frequency, may be transmitted during these horizontal line intervals. As shown in FIG. 6, line 109a is connected directly to transmission gate 110a and is further connected to transmission gate 110b through OR-gate 601. Line 109n, the second line shown as an example in FIG. 6, is connected to the second input of OR-gate 601 and is further directly connected to the enable inputs of transmission gates 110c and 110n. The outputs of all transmission gates are connected to mixer 212 of FIG. 2. It is thus noted that in response to a signal on line 109a, instead of the enabling of only the transmission gate 110a, both transmission gates 110a and 110b are enabled causing code bursts having frequencies F3 and F1 to be transmitted during a selected line interval. Similarly, a signal on line 109n causes the transmission of code bursts of frequency F1, F4 and F7 during a particular line interval during the vertical blanking interval. If this type of signalling is used, it is of course necessary that at the decoder the joint reception of, for example, frequencies F1, F4 and F7 is required to effect the setting, resetting or toggling of the polarity flip-flop. The decoder circuitry will now be discussed with reference to FIG. 7.

Figure 7:
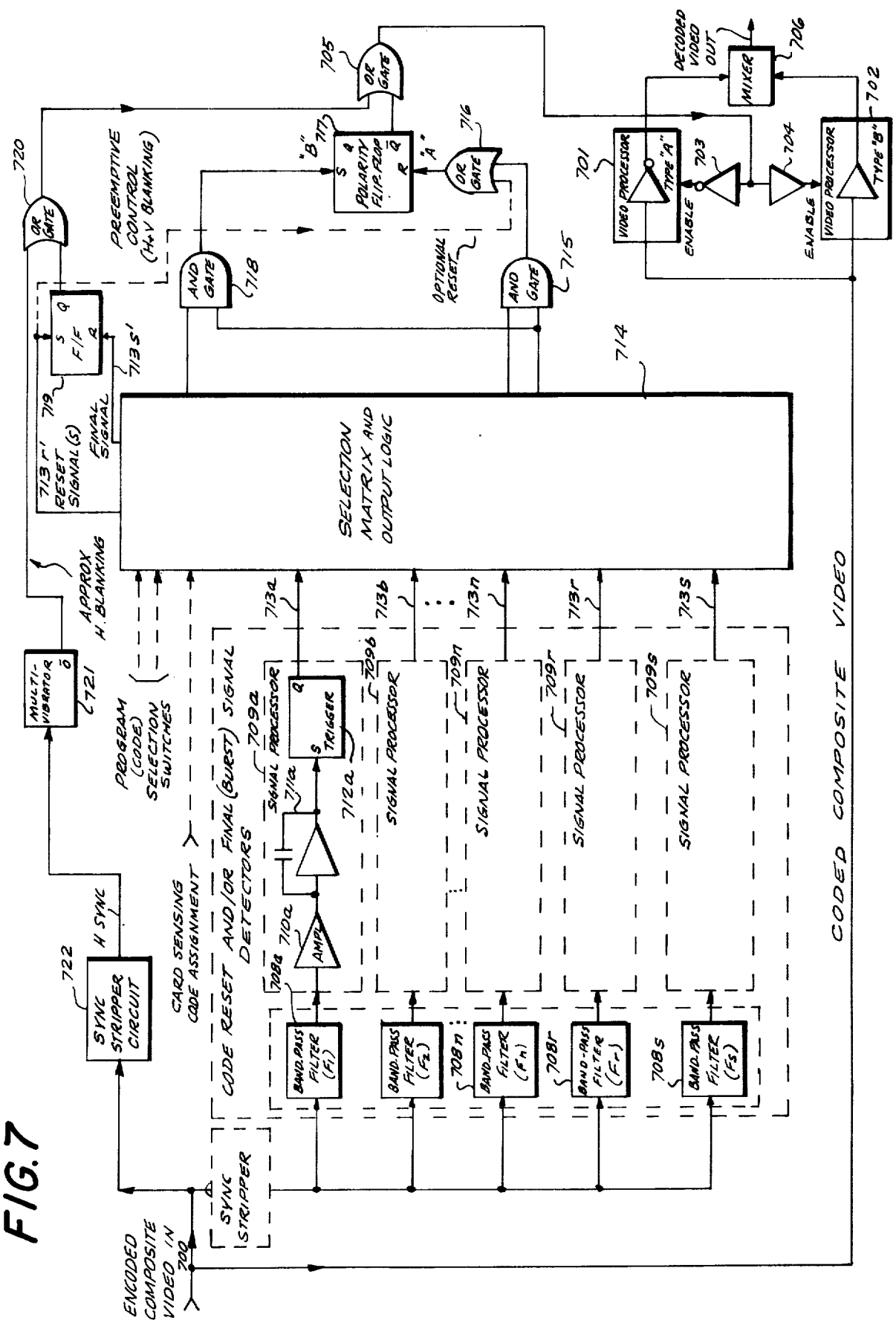
FIG. 7 is a block diagram of the decoding circuit of the present invention as interconnected with the television processing equipment at the receiving end.

In FIG. 7, the encoded composite video signal is received at terminal 700. This signal is directly applied to an inverting amplifier 701 (labelled video processor type A) and a direct amplifier 702 (labelled video processor type B). These correspond to amplifiers 101 and 102 of FIG. 1. As in FIG. 1, amplifier 702 is enabled by the signal at the output of a direct amplifier 704 while amplifier 701 is enabled by the output of an inverting amplifier 703. The enabling of either amplifier 703 or amplifier 704 takes place under control of signals from an OR-gate 705 which again corresponds to OR-gate 105 of FIG. 1. The outputs of amplifiers 701 and 702 are applied to a mixer 706 at whose output the decoded video signal is furnished.

The encoded composite video signal is received at terminal 700 is also applied to an inverter and sync stripper 707 if required. The output of sync stripper 707 is applied in common to a plurality of bandpass filters, each tuned to a different frequency in correspondence with the frequencies furnished by signal generators 111a-111n. Furthermore, one bandpass filter each is required for the reset and final code burst signals. The bandpass filters are labelled 708a-708n for the code burst filters, 708r for the bandpass filter detecting the reset burst and 708s for the bandpass filter detecting the final burst. The output of each of these bandpass filters is applied to an associated signal processor 709a-709n each of which comprises an amplifier 710, an integrator circuit 711 and a Schmitt trigger 712. The output lines of the signal processors are derived from the Q outputs of the Schmitt trigger and are applied through lines 713a-713n, 713r and 713s to the selection matrix and output logic 714. As indicated by dashed lines, in a preferred embodiment of the present invention, the selection matrix is set up by means of program selection switches and/or a code assignment sensed from cards. The output of the selection matrix and output logic 714 (which will be discussed in greater detail below) is applied to an AND-gate 715 whose output is connected through an OR-gate 716 to the R input of polarity flip-flop 717. Further, the output side of unit 714 is also connected to an AND-gate 718 whose output is directly connected to the set (S) input of flip-flop 717. A further input to OR-gate 716 is the signal from line 713r either before or after passing through selection matrix and output logic 714. This signal, shown as appearing on line 713r' at the output of unit 714 is also applied to the set input of a flip-flop 719 whose reset input is connected through line 713s' to unit 714. The Q output of flip-flop 719 is applied to one input of an OR-gate 720 whose output is applied to the second input of OR-gate 705. The second input of OR-gate 720 is derived from the Q output of a monostable multivibrator 721 which is triggered by the output of a sync stripping circuit 722. Sync stripper circuit 722 receives its input directly from terminal 700.

The above-described circuit operates as follows:

The incoming encoded composite video signal received at terminal 700 has a plurality of code bursts which occur in the different line intervals in the vertical blanking interval as described with reference to the encoder. The bandpass filters tuned to the different frequencies correspond to the frequency of the code bursts added at the encoder. Thus if, for example, a code burst of frequency $F_1$ is received, an output will occur for bandpass filter 708a. The resulting signal will be amplifier in amplifier 710a, integrated in integrator unit 711a and, when the so-integrated signal reaches a predetermined threshold amplitude, Schmitt trigger 712a will change state causing a pulse to appear on line 713a. Unit 714, which is set up by use of punched cards or punched cards in connection with program selection switches in a preferred embodiment of the present invention, then assigns the so-received pulse to either AND-gate 715 or AND-gate 718, that is, either to the A or B mode. It is the function of unit 714 to apply the signals to either AND-gate 718 or AND-gate 715 in such a manner that polarity flip-flop 717 has the same state at the end of the vertical blanking interval as did flip-flop 112 at the encoder. Thus at the end of the vertical blanking interval a signal will appear at the $\bar{Q}$ output of flip-flop 717 when the same was the case at the end of the corresponding vertical blanking interval at the sending end for flip-flop 112. The signal at the $\bar{Q}$ output of flip-flop 717 is then applied to OR-gate 705 which, through amplfier 704 enables amplifier 702 which is a direct amplifier, that is the coded composite video signal at its input is transmitted without inversion to mixer 706. For fields in which the $\bar{Q}$ signal appears at the output of flip-flop 717 there is thus no inversion of the picture signal relative to the synchronizing signals. In the absence of a $\bar{Q}$ output no signal will appear at the output of OR-gate 705 except during the horizontal and vertical blanking intervals as will be explained below. Thus, inverting amplifier 703 will enable amplifier 701 and, in the absence of a $\bar{Q}$ output of flip-flop 717, the picture signals will be inverted relative to the synchronizing signals by amplifier 701 before being applied to mixer 706. Since this inversion is a reinversion of the signal previously inverted at the encoder, the signal at the output of mixer 706 will, throughout all fields, have the picture signals in the correct relationship (polarity) relative to the synchronizing signals. The output of mixer 706 is thus standard composite video signal suitable for processing by the standard commercial receiver after RF modulation to an unused TV channel in the area.

In order to prevent inversion of the signals during the horizontal and vertical blanking intervals, the second input of OR-gate 705 is supplied with signals during said blanking intervals through OR-gate 720. Specifically signal 700 is put through a sync stripper circuit 722 which furnishes horizontal synchronizing signals. These horizontal synchronizing signals are applied to a monostable multivibrator 721 which has an output at its Q output for a time period corresponding to the horizontal blanking interval. This signal is applied to one input of OR-gate 720. The other input of OR-gate 720 is energized by the Q output of flip-flop 719. It will be noted that this flip-flop is set, yielding an output at the Q output, in response to the reset signal, that is a signal occurring at a time immediately preceding the vertical blanking interval. Further, it is reset by a signal on line 713s that is a signal occurring immediately prior to the end of the vertical blanking interval. The signal thus appears at the Q output of flip-flop 719 for a time period approximating the vertical blanking interval. Alternatively of course the reset signal could be used to trigger a monostable multivibrator such as monostable multivibrator 721 which, however, would be set for a time period approximating the vertical blanking interval rather than the horizontal blanking interval. In any case the signals appearing at the output of OR-gate 720 will be signals defining both the horizontal and vertical blanking interval, that is signals corresponding to the preemptive control signals furnished to OR-gate 105 of FIG. 1. Thus there will always be a 1 output of OR-gate 705 during the horizontal and vertical blanking intervals causing amplifier 702 to be enabled during these intervals regardless of the state of flip-flop 717. Thus both during the horizontal and vertical blanking intervals and during the picture signal intervals, the output of mixer 706 is the standard video signal.

Figure 8:
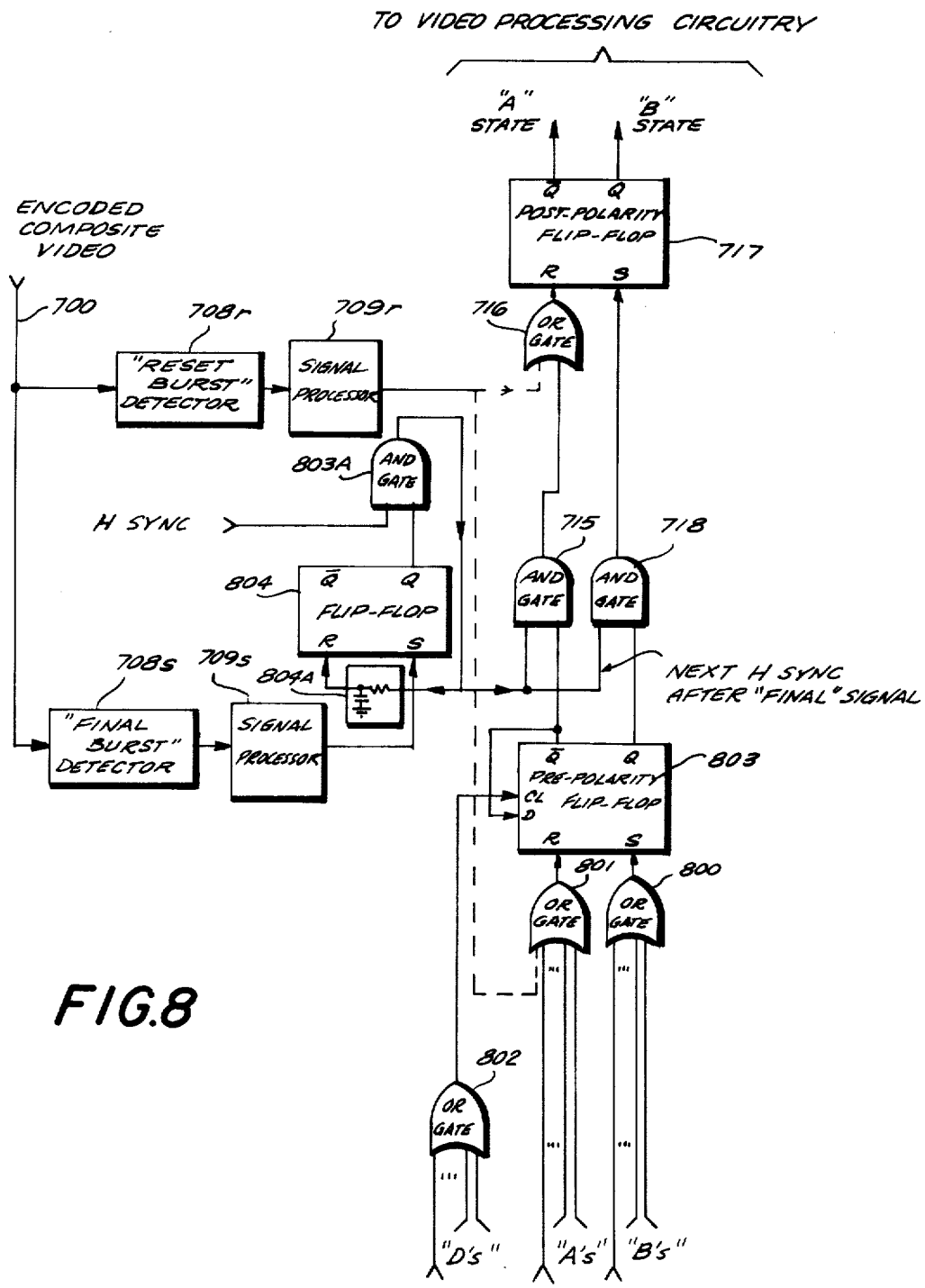
FIG. 8 is a more detailed diagram of the output logic of FIG. 7.

The output logic circuits of unit 714, that is the circuits which directly control flip-flop 717 through AND-gates 715 and 718 will be discussed prior to the discussion of the selection matrix. It should be noted that the selection matrix, in response to inputs from line 713a-713n furnishes three outputs namely mode A outputs which are to reset the polarity flip-flop, mode B outputs which are to set the polarity flip-flop and mode D outputs which are to change the state of the flip-flop from whichever state it is in at the time to the other. As shown in FIG. 8, all A mode output signals are applied to the inputs of an OR-gate 801, all B mode outputs are applied to the inputs of an OR-gate 800 and all D mode outputs are applied to the inputs of an OR-gate 802. The outputs of OR-gates 800, 801 and 802 are applied, respectively, to the set, reset and toggle inputs of a prepolarity flip-flop 803. While this flip-flop could be used directly to control the video processing, the possibility exists that such use might introduce an error. This is due to the fact that the picture signals received may at some time during the picture signal interval create a signal which is passed by one of the code burst detectors 708a-708n. If this were the case, the flip-flop would possibly change state in the absence of a code burst requiring such a change of state. This of course would introduce an error. The remainder of the circuitry of FIG. 8 is designed to decrease the possibility of such an error.

The Q output of flip-flop 803 is connected to one input of an AND-gate 718 while the $\bar{Q}$ output of this flip-flop is connected to the first input of AND-gate 715. The second inputs of AND-gates 718 and 715 are connected in common to the output of an AND-gate 803A. The first input of AND-gate 803A receives the horizontal synchronizing signals, while the second input is connected to the Q output of a flip-flop 804. The R input of flip-flop 804 is also connected to the output of AND-gate 803A through a delay circuit 804A while the S input of flip-flop 804 is connected to the output of signal processor 709s which processes the signals detected by the final burst detector 708s. Finally, FIG. 8 also shows the reset burst detector 708r and the signal processor which processes the output of unit 708r, namely unit 709r. The latter has an output connected to one input of OR-gate 716 and further has an output connected to one input of OR-gate 801.

The above-described circuit functions as follows:

At the start of the vertical blanking interval of a given field, reset burst detector 708r detects a reset burst which, after signal processing in signal processor 709r, resets flip-flop 717 and flip-flop 803. During the vertical blanking interval, the signals received at the inputs of OR-gates 800, 801 and 802 cause the pre-polarity flip-flop 803 to change state a random number of times. At the end of the vertical blanking interval the final burst is detected by final burst detector 708s. The signal at the output of unit 708s is processed in signal processor 709s and the resulting signal is used to set flip-flop 804. A signal at the Q output of flip-flop 804 thus indicates that no more code bursts will be received during the next-subsequent field and that the state of flip-flop 803 is to be transferred to flip-flop 717 which in turn then controls the video processing circuitry. This is accomplished as follows: The horizontal synchronizing signal immediately following the final burst signal causes an output to appear at AND-gate 803A. This output is used to reset flip-flop 804 and further to gate AND-gates 715 and 718. If a signal is then present at the Q output of flip-flop 803 this will be transferred through AND-gate 718 to set flip-flop 717. If, on the other hand, a signal appears at the $\overline{Q}$ output of flip-flop 803, this will be transferred through AND-gate 715 and OR-gate 716 to the R input of flip-flop 717, that is flip-flop 717 will be reset. It will be noted that the output of flip-flop 717 is an output which remains steady throughout substantially the whole vertical blanking interval. The remainder of the decoder circuitry, that is the video processing circuitry, is thus isolated from the frequently changing flip-flop 803 and further the above-mentioned signals which might cause an inadvertent change in flip-flop 803 are also rendered ineffective. The connection from unit 709r to flip-flop 803 is optional. When used, it causes the flip-flop to be in the same state at the start of each vertical blanking interval, regardless of past history. If it is not used, the state of flip-flop 803 at the start of the vertical blanking interval will be the same as its state at the end of the last vertical blanking interval.

It should be noted that the transfer of the state of flip-flop 803 to flip-flop 717 could of course be carried out in different ways also. For example if no final burst is furnished in the transmitted signal, the final burst detector and signal processor (unit 708s and 709s) could be omitted as could flip-flop 804 and AND-gate 803A. These circuit components could be replaced by a simple monostable multivibrator which furnishes a delay approximately equal to the vertical blanking interval. If this delay circuit is connected to the output of unit 709r, the trailing edge of the signal from this monostable multivibrator (which of course would be started by the leading edge of the output of unit 709r) could be used directly as the second input to AND-gates 715 and 718. What is needed is only that AND-gates 715 and 718 become conductive by the end of the vertical blanking interval and after all code bursts have been received.

Figure 9B:
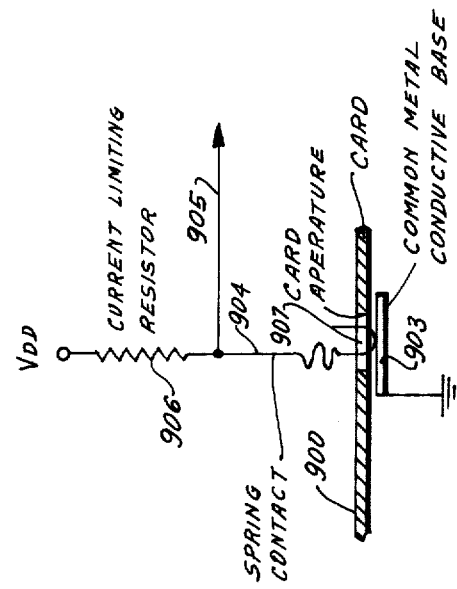
FIG. 9B is a detail showing one element in the code selection matrix of FIG. 9A.

The selection matrix which forms the input of unit 714 of FIG. 7 and which constitutes the programmable logic circuit means of the present invention will now be discussed in detail with reference to FIGS. 9A and 9B.

It is the function of this selection matrix to take the inputs on line 713a-713n and furnish the inputs to OR-gates 800, 801 and 802 in response thereto. That is, the matrix must furnish A, B and D mode outputs in response to the received pulses each of which represent a received code burst of a particular frequency. An "n to 3" matrix wherein the input-output relationship can be changed can of course be set up in any number of ways. The particular type of implementation shown in FIGS. 9A and 9B is to be considered exemplary only.

Figure 9A:
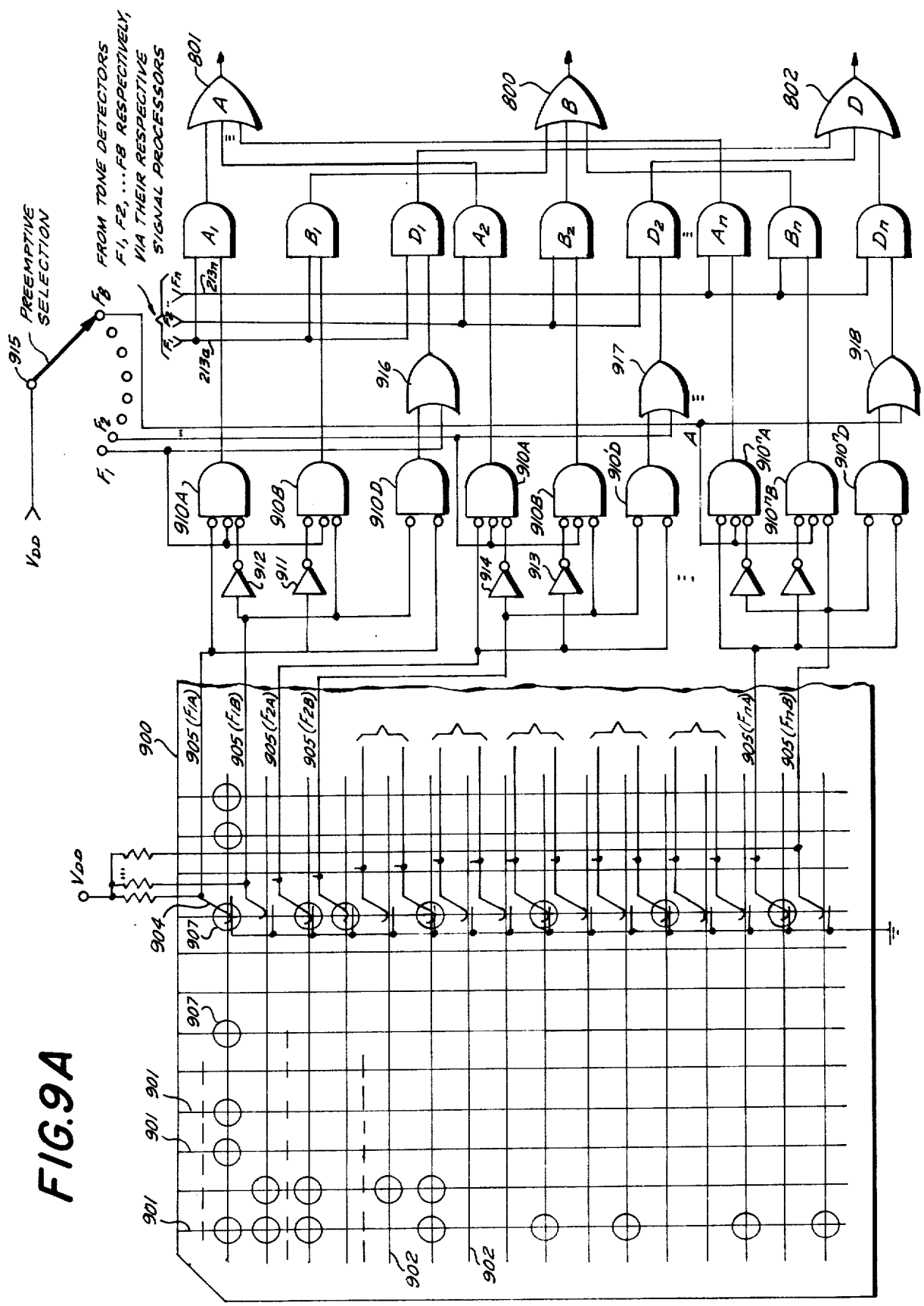
FIG. 9A is a schematic diagram showing one embodiment of decoder logic circuits including multiple "D" code assignment capability.

Referring first to FIG. 9A, the incoming signals $F_1$, $F_2 \ldots F_n$ on lines 213a-213n are each applied to the first inputs of three AND-gates A, B and D. Thus AND-gates $A_1$, $B_1$ and $D_1$, each have a first input connected to line 213a. AND-gates $A_2$, $B_2$ and $D_2$ each have a first input connected to line 213b. Finally, AND-gates $A_n$, $B_n$ and $D_n$ each have a first input connected to line 213n. The outputs of AND-gates $A_1$, $A_2 \ldots A_n$ are connected to the inputs of OR-gate 801. The outputs of AND-gates $B_1$, $B_2 \ldots B_n$ are similarly connected to the inputs of OR-gate 800, while the outputs of AND-gates $D_1$, $D_2 \ldots D_n$ are connected to the inputs of OR-gate 802. The transmission of pulses through AND-gates $A_1 \ldots D_n$ is now to be controlled by a punched program card, punched, for any given program, to assign the pulses on lines 213a-213n to the A, B and D modes in correspondence to the code assignment at the sending end. FIG. 9A shows cards generally indicated by reference numeral 900 which have vertical lines 901 and horizontal lines 902. In the preferred embodiment of the present invention the card comprises a plurality of programs, the matrix for any particular program being located along one of lines 901. It will be noted that some of the intersections of lines 901 with lines 902 have circles around them. These are to indicate punched holes. The mechanism at the decoder which cooperates with cards 900 is shown in more detail in FIG. 9B. As shown in FIG. 9B, the cards are inserted over a common metal conductive base 903. A spring contact 904 makes contact with metal base 903 when a hole is in the card but does not make such contact in the absence of such a hole. The other side of spring contact 904 is connected to a line 905 and is further connected through a resistor 906 to a DC potential source indicated as $V_{DD}$. Thus if there is an aperture 907 in the card, line 905 will be at ground potential, while in the absence of an aperture or hole, line 905 will carry the potential $V_{DD}$.

Returning to FIG. 9A, it should be noted that the selected vertical line 907 for any given program is positioned under the spring contact 904. The intersection of two horizontal lines 902 with the selected line 901 are assigned to each frequency. The line 905 whose potential varies in accordance with the absence or presence of an aperture 907 in the topmost horizontal line is labelled 905 ($F_{1A}$). The line underneath that, also assigned to frequency $F_1$, is labelled 905 ($F_{1B}$). The next two lines 905 are, respectively, labelled 905 ($F_{2A}$) and 905 ($F_{2B}$). The last pair of lines is labelled 905 ($F_{nA}$) and 905 ($F_{nB}$). Line 905 ($F_{1A}$) is directly connected to an inverting input of AND-gates 910A and 910D and through an inverter 911 to the inverting input of an AND-gate 910B. Line 905 ($F_{1B}$) is directly connected to the inverting input of AND-gates 910B and 910D and through an inverter 912 to the inverting input of AND-gate 910A. Similarly line 905 ($F_{2A}$) is directly connected to the inverting inputs of AND-gates 910'A and 910'D and through an inverter 913 to the inverting inputs of AND-gate 910'B. Line 905 ($F_{2B}$) is similarly directly connected to the inverting inputs of AND-gates 910'B and 910'D and through an inverter 914 to the inverting input of an AND-gate 910'A. The pairs of lines assigned to the remaining frequencies are similarly connected and will not be discussed in detail here. Further shown in FIG. 9A is a selector switch 915 which applies the voltage $V_{DD}$ selectively to one of a number of terminals $F_1...F_n$. Terminal $F_1$ is connected to the inverting inputs of AND-gates 910A and 910B. It is further connected to the first input of an OR-gate whose second input is connected to the output of AND-gate 910D. Similarly terminal $F_2$ is connected to the inverting inputs of AND-gates 910'A and 910'B. It is also connected to the first input of an OR-gate 917 whose second input is connected to the output of AND-gate 910'D. The remaining terminals are similarly connected to further AND and further OR-gates. The output of AND-gate 910A is connected to an input of AND-gate $A_1$, the output of AND-gate 910B is connected to one input of AND-gate $B_1$, and the output of OR-gate 916 is connected to one input of AND-gate $D_1$. As mentioned above, the other inputs of AND-gates $A_1$, $B_1$ and $D_1$ are connected to receive pulses in the presence of code bursts of frequency $F_1$.

Similarly, the second input of AND-gate $A_2$ is connected to the output of AND-gate 910'A, the second input of AND-gate $B_2$ is connected to the output of AND-gate 910'B and the second input of AND-gate $D_2$ is connected to the output of OR-gate 917. Again similar connections exist at the remaining frequencies.

The above-described arrangement operates as follows:

In general it should be noted that in accordance with the circuitry of FIG. 9A code assignments to the A, B and D modes can be made by means of card 900. Further, changes in the code assignments can be carried out by means of selector switch 915. The system is set up in such a way that a code assignment by the selector switch overrides the previous code assignment made by card. The switch thus provides greater flexibility allowing previously stored information (as, in the system shown in FIG. 9A, information stored in the form of punched holes in a card) to be supplemented by later information set in by the subscriber in accordance with information furnished by the supplier of the coded signal.

To proceed with the circuitry in FIG. 9A, it should be noted that for the top two lines, both assigned to frequency $F_1$, an aperture exists in the top line but none exists in the bottom line. Under this condition ground potential is carried on line 905 ($F_{1A}$) and the voltage $V_{DD}$ exists on line 905 ($F_{1B}$). Since line 905 ($F_{1A}$) carries ground potential, one input of AND-gate 910A and one input of AND-gate 910D will be enabled. AND-gate 910B is disabled since the signal from line 905 ($F_{1A}$) passes through inverter 911. Since the signal on line 905 ($F_{1B}$) is a high signal, the second input of AND-gate 910A will also be enabled while AND-gate 910D will be blocked since a high signal will appear at its second inverting input. AND-gate 910B will also be blocked because of the high signal on line 905 ($F_{1B}$). Thus only AND-gate 910A will be enabled causing the signal on line 213A when present to pass through AND-gate $A_1$, thereafter through OR-gate 801 and then to the reset input of the prepolarity flip-flop (see FIG. 8). Since AND-gate 910B is blocked, AND-gate $B_1$ is blocked. When selector switch 915 is in the position shown, the terminal $F_1$ does not carry high potential and therefore there is no signal at the output of OR-gate since AND-gate 910D is also blocked. AND-gate $D_1$ is therefore also blocked and the only path for the signal on line 213a is to AND-gate $A_1$ and OR-gate 801.

For the next two lines, namely line 905 ($F_{2A}$) and line 905 ($F_{2B}$) it is assumed that two holes have been punched and that therefore both of these lines carry ground potential. Under these conditions reference to FIG. 9A will show that AND-gates 910'A and 910'B are blocked while AND-gate 910'D is conductive. A signal is thus transmitted through OR-gate 917 to one input of AND-gate $D_2$. Thus, upon receipt of a code burst of frequency $F_2$, the pulse will pass through AND-gate $D_2$ to the input of OR-gate 802 thereby causing the polarity flip-flop to change state. Similarly if the bottom line of a pair of lines is punched, while the top line is not punched, a pulse will appear at the output of OR-gate 800 causing the flip-flop to be set.

Lastly, the lowest lines, namely lines 905 ($F_{nA}$) and 905($F_{nB}$) will be examined. It is seen that line 905 ($F_{nA}$) carries ground potential while line 905 ($F_{nB}$) carries the voltage $V_{DD}$. It should also be noted that selector switch 915 is set so that terminal $F_n$ carries a voltage $V_{DD}$. Under this condition it will be noted that AND-gates $910_{nA}$ and $910_{nB}$ are blocked by the signal from switch 915, regardless of the signals on lines 905 ($F_{nA}$) or 905 ($F_{nB}$). AND-gate $910_{nD}$ is also blocked because of the signal on line 905 ($F_{nB}$). However, OR-gate 918 does yield an output signal gating AND-gate $D_n$ again because of the signal from selection switch 915. Thus the frequency $F_n$ causes a signal to appear at the output of AND-gate $D_n$ which in turn is applied to OR-gate 802 to change the state of flip-flop 803.

It is seen that the system of FIG. 9A allows the selection of the A, B or D mode in correspondence with the mode at the sending end for each of the code frequencies by use of a punched card. It further provides for a selector switch which can preempt one of the frequencies and assign the so preempted frequency to the D mode independent of the stored program code assignment as supplied in this example by the punched card. The stored program assignment could of course equally well be furnished in another manner as, for example, over telephone lines prior to the start of the program. Further, the preemptive selection could of course cause assignment to a mode other than the D mode. FIG. 9A constitutes a preferred embodiment but the present invention is of course in no way limited to this embodiment.

Further, respective to FIG. 9A, it should be noted that where no holes are punched for any pair of horizontal lines along a given vertical line, the corresponding frequency is assigned to the C mode, that is a mode which is transmitted for confusion purposes only and does not affect the state of the polarity flip-flops at all.

Figure 10:
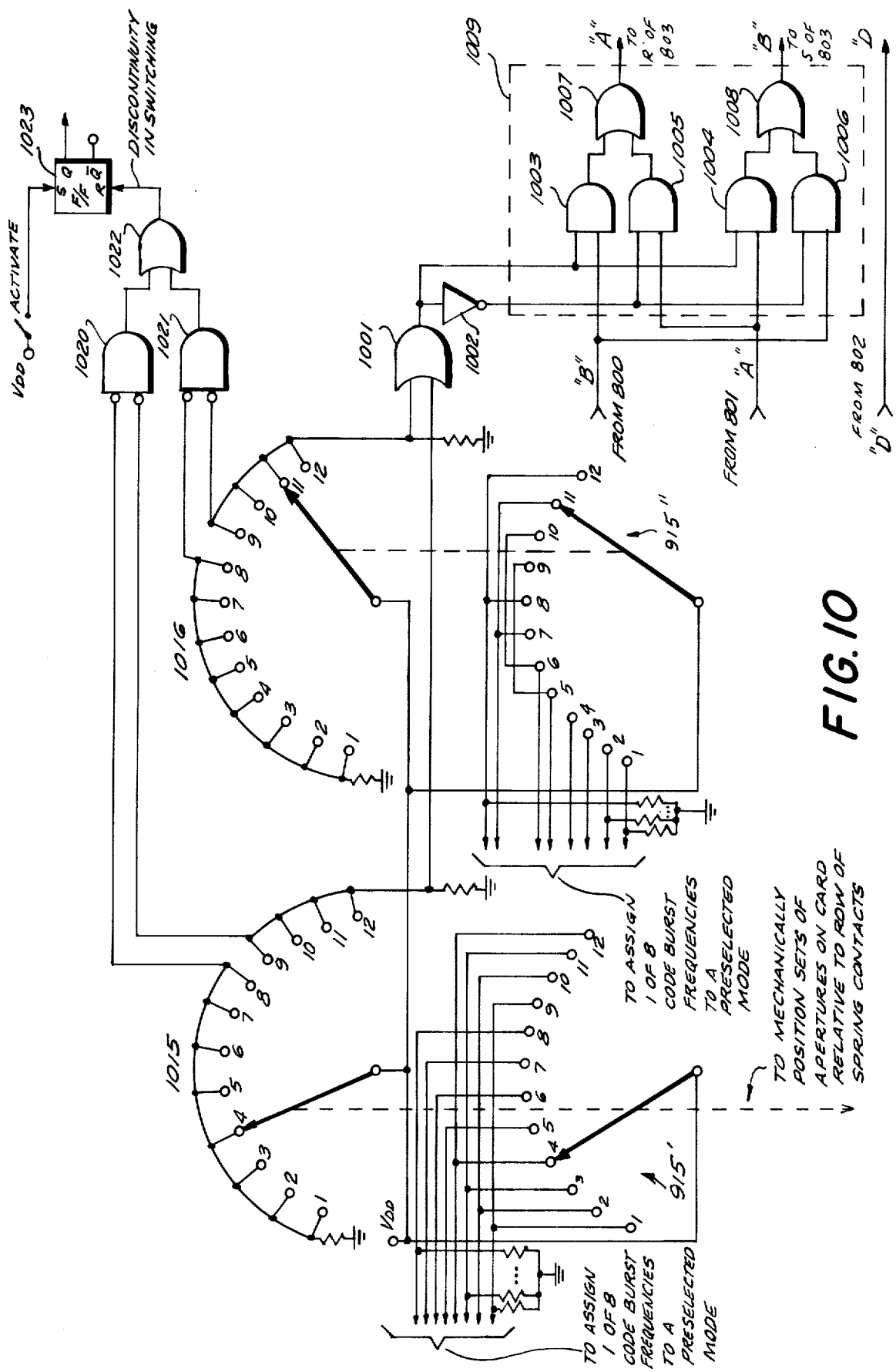
FIG. 10 is a schematic diagram of a reversing switch circuit allowing interchange of A and B mode assignments and for sensing changes of switch position.

FIG. 10 shows an optional feature of the system at the receiving end of the pay television system. It is designed to increase the capacity of the program furnishing means, that is of the punched cards or other means which store the program code assignment. In FIG. 10 there is shown switch 915' which corresponds to switch 915 of FIG. 9A. Switch 915' has a first set of eight contacts which are illustrative of the 1-n contacts in the switch of FIG. 9A. It has a second set of contacts 9–12 which are connected in parallel with the first four contacts in the first set. The selector arm of a second switch 1015 is mechanically coupled to the selector arm of switch 915'. Both selector arms are connected to potential $V_{DD}$ and the first and second set of both switches are each connected through a resistor to ground potential. The contacts 9–12 of the switch 1015 are connected in common to the first input of an OR-gate 1001. The second input of OR-gate 1001 is connected to contacts 9–12 of a third selector switch labelled 1016. The third selector switch 1016 is identical to switch 1015 both in connection and number of contacts. Further, the selector arm of switch 1016 is mechanically coupled to the selector arm of a switch 915" which is similar to switch 915'.

The output of OR-gate 1001 is connected to an inverter 1002 and directly to, respectively, the first and second control input of a reversing switch labelled 1009. The signal input from inputs of reversing switch 1009 are respectively derived from OR-gate 800 and OR-gate 801 of FIG. 9A. The first signal input, namely the input from OR-gate 800 is connected to the first input of an AND-gate 1003 and of an AND-gate 1006. The second signal input, namely the signal input from OR-gate 801 is directly connected to the first input of an AND-gate 1005 and that of an AND-gate 1004. The second inputs of AND-gates 1003 and 1004 are both connected directly to the output of OR-gate 1001, while the second inputs of AND-gates 1006 and 1005 are connected to the output of inverter 1002. The outputs of AND-gates 1003 and 1005 are connected respectively to the first and second input of an OR-gate 1007 whose output constitutes the first reversing switch output. The outputs of AND-gates 1004 and 1006 are connected to the first and second inputs of an OR-gate 1008 whose output constitutes the second reversing switch output.

A further feature of the present invention is illustrated by AND-gates 1020 and 1021 also shown in FIG. 10. AND-gate 1020 has one input connected to the first set of switch contacts of switch 1015 and a second input connected to the second set of switch contacts of this switch. AND-gate 1021 has inputs similarly connected to the two sets of contacts of switch 1016. The outputs of AND-gates 1020 and 1021 are connected to the first and second input of an OR-gate 1022 whose output is connected to the reset input of a flip-flop 1023. The set input of flip-flop 1023 is connected through an activation switch to the voltage $V_{DD}$. The Q output of flip-flop 1023 furnishes a signal which is required for enabling the video processing equipment.

The above-described equipment operates as follows:

Switch 915' and switch 915" are first set to each of the particular frequencies which is to be assigned to a particular preselected mode. If the so-assigned frequency is one of the frequencies $F_1$-$F_4$, it is then necessary to determine whether an A/B inversion is to take place. This of course is information which must be received by the subscriber in order to enable him to set the switches properly. If the inversion mode is desired one of switches 1015 ot 1016 must be set to one of the contacts 9–12. When either of the switches is so set, a signal is transmitted through OR-gate 1001 which causes the desired control signals to appear at the control inputs of reversing switch 1009. For example, let it be assumed that a B mode signal is received from OR-gate 800. This signal is applied to one input of AND-gate 1003 which, in the presence of an output signal at OR-gate 1001 is conductive, causing a signal to pass through OR-gate 1007 to the A output of reversing switch 1009. The same B signal applied at the input of AND-gate 1006 is blocked by the signal at the output of inverter 1002. Thus no signal appears at the B output of switch 1009. The circuit acts similarly in response to an A signal from OR-gate 801. This signal is transmitted to the B output only and is blocked from the A output of reversing switch 1009.

The second feature shown in FIG. 10 is a detection of a change in the switching position of either one of these switches. This may be desired in order to require a re-activation of the video processing circuitry in case one of the switches has been moved. It will be noted that AND-gates 1020 and 1021 both have inverting inputs and that switches 1015 and 1016 have non-shorting contacts. Thus the voltage $V_{DD}$ will always be present at one of the inputs of AND-gates 1020 and 1021 unless the selector arm is moving from one position to the next. During such movement, the input conditions at one of the AND-gates will be satisfied causing it to generate an output signal which passes through OR-gate 1022 and resets flip-flop 1023. In response to a 1 signal at the $\overline{Q}$ output of flip-flop 1023, the video processing is inhibited until such time as the actuating switch is again depressed thereby causing a billing charge to be entered and the video processing will then resume. The circuit of FIG. 10 thus effectively stops the generation of a decoded television signal, upon the repositioning of one of the switches 915' or 915", until the decoder is reactivated by the subscriber.

Figure 12:
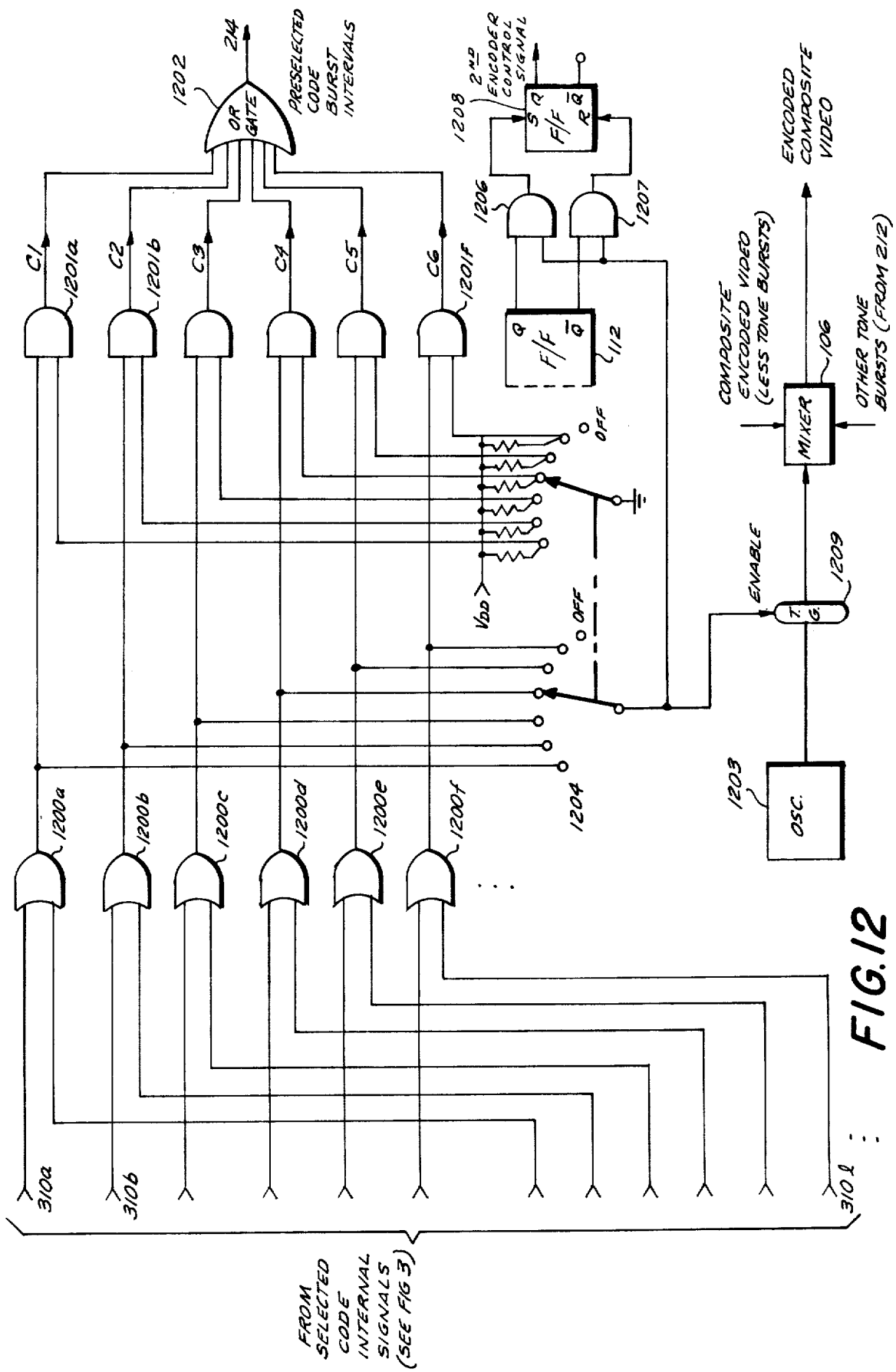
FIG. 12 is a diagram showing equipment at the transmitting end for generating two encoder control signals.

FIG. 12 shows an optional feature of the system of the present invention. Specifically, it may be desired that the encoder at the sending end changes not one but two characteristic values of the signal in order to create the encoded television signal. In addition to the reversal of the picture signal relative to the synchronizing signals mentioned above, it may, for example, be desired to change these synchronizing signals independently of the changes in the picture signal. Thus a second encoder signal would be required. The circuitry of an embodiment for implementing this is shown in FIG. 12.

FIG. 12 comprises a plurality of OR-gates 1200a, 1200b... 1200f for receiving signals from lines 310a, 310b, etc. shown in FIG. 3. The output of OR-gates 1200a-1200f, each constitute one input to a corresponding AND-gate 1201a-1201f. The signal inputs of AND-gate 1201a-1201f are derived each from one position of a selector switch 1205. The signals at the outputs of OR-gates 1200a-1200f also serve as inputs to a selector switch 1204, whose output serves as an enabling input to a transmission gate 1209. The signal input to transmission gate 1209 is derived from an oscillator 1203 which furnishes a signal having a determined frequency in the same frequency range as oscillators 111. The output of transmission gate 1209 constitutes one input of mixer 106.

The output of selector switch 1204 also serves as one input of AND-gates 1206 and 1207, whose other inputs are derived, respectively, from Q and $\overline{Q}$ outputs of flip-flop 112. The outputs of AND-gates 1206 and 1207 are applied, respectively, to the set and reset inputs of a flip-flop 1208. The Q output of flip-flop 1208 constitutes the second encoder control signal.

The above described circuitry operates as follows:

The signals on lines 310a-310n are signals defining predetermined horizontal line intervals in sequential fields. OR-gates 1200a-1200f serve to furnish one output for each pair of corresponding lines in the two fields. Each output of an OR-gate is thus a signal defining a predetermined line interval in each of two sequential fields. A particular one of these pairs of lines is selected by activation of selector switch 1204 to enable transmission gate 1209. The output of transmission gate 1209 is thus a signal of a predetermined frequency occurring during a predetermined line interval of the vertical blanking intervals herein referred to as the intermediate signal. This is applied to mixer 106, which is then transmitted to the decoder at the receiving end.

During the time that this intermediate signal is being transmitted the sending of any other of the code burst is inhibited. It will be noted that selector switch 1205 is mechanically coupled to switch 1204 so that a ground signal is applied to that one of AND-gates 1202a, etc., whose other input is the enabling signal of AND-gate 1209. No output will thus occur at the output of the so-inhibited AND-gate during the time interval during which the intermediate signal is being transmitted. Since the voltage of all points, except the selected one, of selector switch 1205 is the value $V_{DD}$, the remaining AND-gates will be conductive and furnished at their outputs the required code burst timing signals.

Figure 13:
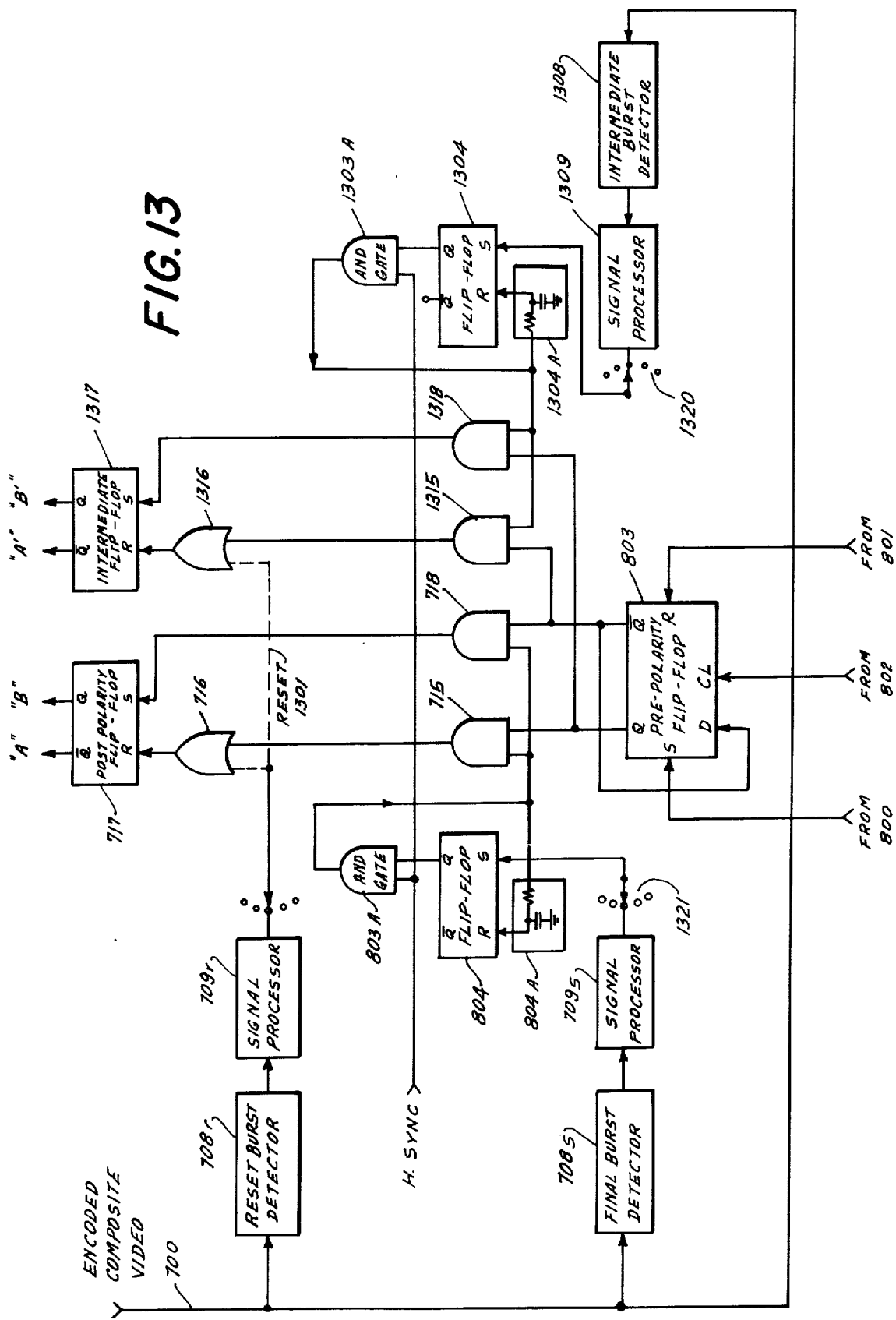
FIG. 13 is a diagram of decoder equipment corresponding to the encoder equipment of FIG. 12.

FIG. 13 shows a preferred embodiment of the circuitry at the decoder when the circuitry of FIG. 12 is used at the encoder. FIG. 13 is in part a duplication of the circuitry shown in FIG. 8. Specifically, the post-polarity flip-flop 717 and its associated circuits, as well as the pre-polarity flip-flop 803 were previously shown in FIG. 8. The additional circuitry shown in FIG. 13 includes an intermediate burst detector 1308 and its associated signal processor 1309. A selection switch 1320 indicates schematically that one of a number of intermediate burst detectors, each tuned to a different frequency, may be used. The output of signal processor 1309 is applied through switch 1320 to the set input of a flip-flop 1304. The Q outputs of flip-flop 1304 is connected to one input of an AND-gate 1303A, whose output is connected through a delay circuit 1304A to the reset input of flip-flop 1304. The second input of AND-gate 1303 A is a line furnishing the horizontal synchronizing signals. The output of AND-gate 1303A also serves as the first input of two AND-gates 1315 and 1318.

The second input of AND gates 1315 and 1318 are the $\overline{Q}$ and Q outputs, respectively, of flip-flop 803. The output of AND-gate 1315 is connected to one input of an OR-gate 1316 whose other input (optional) is the reset signal on line 1301. The output of OR-gate 1316 is applied to the reset input of an intermediate flip-flop 1317. The output of AND gate 1318 is directly connected to the set input of flip-flop 1317. The Q output of flip-flop 1307 is the second decoder control signal.

The above described circuit operates as follows:

Upon receipt of a signal having the frequency associated with the intermediate burst detector 1308, a pulse appears at the output of siganl processor 1309. This causes flip-flop 1304 to set. Upon occurrence of the next horizontal synchronizing signal, AND-gate 1303 furnishes an output signal which enables AND-gates 1315 and 1318. Since the intermediate signal which caused the pulse to appear at the output of signal processor 1309 is a signal which occurs in a predetermined horizontal line interval during the vertical blanking interval, the AND-gates are enabled at a corresponding time and cause the state of flip-flop 803, that is the 1 signal at either the Q or $\overline{Q}$ output of flip-flop 803 which exists at this time to be transferred to flip-flop 1317 where it is stored. The state of flip-flop 1317 therefore corresponds to that of flip-flop 803 just after receipt of the intermediate signal. The Q output of flip-flop 1317 constitutes a second decoder control signal, that is processing a portion of the composite video signal from a first to a second state can be controlled in accordance with the state of flip-flop 1317.

For the present invention, it should be noted that any known modulation systems (amplitude, frequency, or phase) could readily be used instead of code bursts to convey the code information from the sending end to the receiving end. Such systems are to be included in the scope of this invention.

It should also be noted that the words "transmitter" and "receiver" refers to sending and receiving equipment in both over-the-air and cable pay television systems.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a pay television system having encoder means at the sending end for changing a determined characteristic of an input television signal from a normal to an encoded state in response to an encoder control signal, thereby creating an encode television signal, and decoder means at the receiving end for changing said determined characteristic back to said normal state in response to a decoder control signal, a coding system comprising, in combination, coding signal furnishing means for furnishing a plurality of coding signals, each having a characteristic value differing from the characteristic value of the others of said coding signals, each in response to a corresponding enabling signal; enabling means connected to said coding signal furnishing means for furnishing said enabling signals to said coding signal furnishing means during predetermined time intervals of said input television signal; programmable logic circuit means including selectively operable means for setting up a program code assignment, connected to said enabling means and said encoder means for furnishing said encoder control signal only in response to enabling signals selected in accordance with said program code assignment; and mixer means connected to said coding signal furnishing means for inserting said coding signals into said encoded television signal, prior to transmitting said encoded television signal to said decoder means.

2. A pay television system as set forth in claim 1, wherein said enabling means comprise code burst interval generator means for generating code burst timing signals only during predetermined horizontal line intervals of determined vertical blanking intervals, number generator means for generating number signals signifying corresponding ones of said coding signals, and means for furnishing said enabling signals under control of said code burst timing signals and said number signals, whereby said enabling signals are furnished during said determined vertical blanking intervals only.

3. A system as set forth in claim 2, wherein said number generator means comprise a random number generator.

4. A system as set forth in claim 3, wherein said random number generator comprises noise generator means for furnishing a noise signal having a randomly varying amplitude, trigger circuit means connected to said noise signal generator means for furnishing a trigger signal when the amplitude of said noise signal exceeds a predetermined amplitude, and ring counter means connected to said trigger circuit means for counting said trigger signals and furnishing said number signal in correspondence to the number of so-counted trigger signals.

5. A system as set forth in claim 4, wherein said enabling means further comprises means for furnishing additional timing signals in determined time intervals preceding said code burst signals and enabling said ring counter means to count in the presence of said additional timing signals only.

6. A pay television system as set forth in claim 2, wherein said coding signal furnishing means comprise a plurality of high frequency oscillator means for furnishing a plurality of high frequency signals, each having a frequency differing from the frequencies of the others of said high frequency oscillator signals.

7. A system as set forth in claim 6, wherein said means for furnishing said enabling signals comprise a plurality of AND-gate means, each having an output connected to a corresponding one of said high-frequency oscillator means, a first input connected to said number generator means for receiving a corresponding one of said number signals and a second input connected to said code burst interval generator means for receiving said code burst timing signals, each for furnishing an enabling signal to said corresponding one of said high-frequency oscillator means in response to the simultaneous presence of signals at said first and second inputs.

8. A system as set forth in claim 6, wherein said high-frequency oscillator means each comprise a high-frequency oscillator and a transmission gate having a signal input connected to said oscillator, an enabling input connected to said enabling means, and a transmission gate output, for transmitting said high-frequency oscillator signal from said signal input to said transmission gate output in response to an enabling signal only.

9. A system as set forth in claim 8, further comprising a common line connecting all of said transmission gate outputs to said mixer means.

10. A system as set forth in claim 1, wherein said enabling means have a plurality of enabling outputs, each for furnishing one of said corresponding enabling signals; and wherein said programmable logic circuit means comprise bistable circuit means having at least a first and second input and an output, for furnishing said encoder control signal at said output only in response to a signal at said first input, and wherein said selectively operable means comprise a plurality of switch means each for connecting a corresponding one of said enabling outputs to a selected one of said first or second inputs in accordance with said program code assignment.

11. A system as set forth in claim 10, wherein said bistable circuit means has a first, second and third input and a first and second output, and is adapted to assume a first stable state in response to a signal at said first input, a second stable state in response to a signal at said second input, and to switch from said first to said second and said second to said first stable state in response to a signal at said third input; and wherein said switch means comprise selection switch means for selectably connecting each of said enabling outputs to one of said first, second or third inputs of said bistable circuit means.

12. A system as set forth in claim 11, further comprising monitoring means for counting the number of consecutive times an enabling signal is received at said second input and furnishing a corresponding first counting signal; and means connected to said monitoring means for automatically switching said bistable circuit means to said first stable state in response to a counting signal signifying a number exceeding a predetermined number.

13. A system as set forth in claim 12, wherein said monitoring means further comprises means for counting the number of consecutive times an enabling signal is received at said first input and furnishing a corresponding second counting signal; and wherein said means connected to said monitoring means further comprise means for automatically switching said bistable circuit means to said second stable state in response to a second counting signal signifying a number exceeding a predetermined number.

14. A system as set forth in claim 12, wherein said coding signal furnishing means comprise a plurality of high frequency oscillator means, each for furnishing a high-frequency oscillator signal; wherein said enabling means comprise code burst interval generator means for generating code burst timing signals during predetermined horizontal line intervals of determined vertical blanking intervals only, and for generating a final burst timing signal during said determined vertical blanking intervals following said code burst timing signals, random number generator means for randomly generating a number signal signifying a corresponding one of said high-frequency oscillator means, means for furnishing said enabling signals under control of said code burst timing signals and said number signals, and means for furnishing a final enable signal under control of said final burst timing signal.

15. A system as set forth in claim 14, wherein said monitoring means comprise shift register means having a determined number of stages, a shift input and a reset input, a first and second AND-gate having a first and second output respectively connected to said shift and said reset input of said shift register, each of said AND-gates further having a first input connected to said code burst interval generator means for receiving said final burst timing signal, said first and second AND-gates having, respectively, a second input connected to said first and second output of said bistable circuit means.

16. A system as set forth in claim 15, wherein said means for automatically switching said bistable circuit means to said first stable state comprise an AND-gate having a first input connected to a determined one of said shift register stages, a second input connected to said code burst interval generator means for receiving a determined one of said code burst timing signals, and an output, and means for connecting said output to said programmable logic circuit means in such a manner that said encoder control signal is generated in respone to a signal at said output.

17. A pay television system as set forth in claim 2, wherein said code burst interval generator means further comprise means for generating a reset timing signal approximately at the start of each of said determined vertical blanking intervals; wherein said coding signal furnishing means include means for furnishing a reset signal; wherein said enabling means further comprise means for furnishing a reset enabling signal under control of said reset timing signal; wherein said logic circuit means comprise bistable circuit means having at least a first and second input, and an output, for furnishing said encoder control signal at said output in response to a signal at said first input only; and wherein said logic circuit means further comprise means for applying said reset enabling signal to said second input of said bistable circuit means, whereby said bistable circuit means is reset at the start of each of said determined vertical blanking intervals.

18. A pay television system as set forth in claim 11, wherein said enabling means comprise means for furnishing said enabling signals during determined vertical blanking intervals only, whereby said bistable circuit means changes state during said determined blanking intervals only; and wherein said bistable circuit means furnish said encoder control signal only when in said first state, whereby the absence or presence of said encoder control signal remains unchanged throughout the field following each of said determined vertical blanking intervals.

19. A pay television system as set forth in claim 18, wherein said encoder means comprises means for changing a first and a second determined characteristic of said input television signal from a normal to an encoded state in response to a first and second encoder signal respectively; further comprising means for sampling said bistable circuit means during a predetermined horizontal line interval of each of said determined vertical blanking intervals and furnishing said second encoder control signal to said encoder means only if said bistable circuit means is in a selected one of said first and second states when so sampled.

20. A system as set forth in claim 1, wherein said decoder means comprise a plurality of means for furnishing decoder input signals, each in response to a corresponding one of said coding signals, program furnishing means for furnishing said program code assignment, and decoder logic circuit means connected to said means for furnishing decoder input signals and said program furnishing means for receiving said decoder input signals and furnishing said decoder signal in response thereto under control of said program code assignment.

21. A system as set forth in claim 20, wherein said program furnishing means comprise a punched card having apertures constituting said program code assignment; and wherein said decoder logic circuit means comprise a plurality of spring contacts, a plurality of output lines each connected to a corresponding one of said spring contacts, and means for connecting each of said lines to a first reference potential in the absence of one of said apertures and to a second reference potential in the presence of one of said apertures.

22. A system as set forth in claim 21, wherein said decoder logic circuit means comprises bistable circuit having a first, second and third input and a first and second output, said bistable circuit means being adapted to assume a first stable state furnishing said decoder control signal at said first output in response to a signal at said first input, a second stable state for furnishing a bistable output signal at said second output in response to a signal at said second input, and to switch from said first to said second and said second to said first stable state in response to a signal at said third input, and wherein said decoder logic circuit means further comprise a plurality of logic gates for receiving said decoder input signals and applying said decoder input signals selectively to said first, second or third input of said bistable circuit means under control of said reference potentials on said output lines.

23. A system as set forth in claim 22, further comprising preemptive control means connected to said decoder logic circuit means for applying at least a selected one of said decoder input signals to a selected one of said inputs of said bistable circuit means independent of said program code assignment.

24. A system as set forth in claim 22, further comprising reversing means operable upon activation to revese the program code assignment of decoder input signals assigned to said first and second input of said bistable circuit means respectively.

* * * * *